(12) United States Patent
Park et al.

(10) Patent No.: US 11,095,340 B2
(45) Date of Patent: Aug. 17, 2021

(54) BEAMFORMING METHOD AND ELECTRONIC DEVICE THEREFOR

(71) Applicant: Samsung Electronics Co., Ltd., Suwon-si (KR)

(72) Inventors: Sungchul Park, Suwon-si (KR); Suha Yoon, Suwon-si (KR); Euichang Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/045,608

(22) PCT Filed: Jun. 21, 2019

(86) PCT No.: PCT/KR2019/007520
§ 371 (c)(1),
(2) Date: Oct. 6, 2020

(87) PCT Pub. No.: WO2020/009356
PCT Pub. Date: Jan. 9, 2020

(65) Prior Publication Data
US 2021/0036741 A1 Feb. 4, 2021

(30) Foreign Application Priority Data
Jul. 2, 2018 (KR) .................. 10-2018-0076596

(51) Int. Cl.
*H04B 7/04* (2017.01)
*H04B 7/024* (2017.01)
(Continued)

(52) U.S. Cl.
CPC .......... *H04B 7/024* (2013.01); *H04B 7/0404* (2013.01); *H04B 7/06* (2013.01)

(58) Field of Classification Search
CPC ... H04B 7/00; H04B 7/02; H04B 7/04; H04B 7/0404; H04B 7/0408; H04B 7/0413;
(Continued)

(56) References Cited

U.S. PATENT DOCUMENTS 9,337,969 B2 5/2016 Raghavan et al.
9,854,568 B2 12/2017 Chen et al.
(Continued)

FOREIGN PATENT DOCUMENTS

EP 2 887 562 A1 6/2015
KR 10-2017-0067746 A 6/2017
(Continued)

OTHER PUBLICATIONS

Samsung, 'Beamforming related issues for NR-Unlicensed study', R2-1808292, Busan, Korea, May 11, 2018.
(Continued)

*Primary Examiner* — Siu M Lee
(74) *Attorney, Agent, or Firm* — Jefferson IP Law, LLP

(57) ABSTRACT

Disclosed is an electronic device including housing, a first antenna array positioned on the housing and/or inside the housing, a second antenna array spaced from the first antenna array and positioned on the housing and/or inside the housing, at least one wireless communication circuit electrically connected to the first antenna array and the second antenna array, and at least one communication processor transmitting and/or receiving a signal through the at least one wireless communication circuit, using beamforming. In addition, various embodiments as understood from the specification are also possible.

15 Claims, 13 Drawing Sheets

(51) Int. Cl.
*H04B 7/0404* (2017.01)
*H04B 7/06* (2006.01)

(58) Field of Classification Search
CPC ...... H04B 7/06; H04B 7/0613; H04B 7/0617;
H04B 7/0695
See application file for complete search history.

(56) References Cited

U.S. PATENT DOCUMENTS

| | | |
|---|---|---|
| 2015/0223125 A1 | 8/2015 | Lu et al. |
| 2016/0020876 A1 | 1/2016 | Raghavan et al. |
| 2016/0248451 A1 | 8/2016 | Weissman et al. |
| 2019/0150003 A1* | 5/2019 | He .................... H04B 7/086 |
| | | 342/368 |
| 2019/0222279 A1 | 7/2019 | Xi et al. |
| 2020/0195324 A1* | 6/2020 | Grant .................... H04W 24/10 |

FOREIGN PATENT DOCUMENTS

| | | |
|---|---|---|
| KR | 10-2017-0093071 A | 8/2017 |
| KR | 10-2017-0118750 A | 10/2017 |
| WO | 2018/064327 A1 | 4/2018 |

OTHER PUBLICATIONS

European Search Report dated Mar. 24, 2021, issued in European Application No. 19830236.6.

* cited by examiner

BEAMFORMING METHOD AND ELECTRONIC DEVICE THEREFOR

TECHNICAL FIELD

Embodiments disclosed in this specification are related to a beamforming technology of an electronic device.

BACKGROUND ART

As smart phones became popular, mobile data traffic has been exploded. The wireless communication system (e.g., 3rd generation partnership project (3GPP) or long term evolution (LTE)) introduces a carrier aggregation (CA) technology, as one way to solve this. The CA technology refers to a technology that allocates a primary component carrier (PCC) to a primary cell (PCell), allocates the remaining secondary component carrier(s) to a secondary cell (SCell), and then transmits data by aggregating several combinations of bandwidths. The CA technology may effectively increase the transmission bandwidth in communication technology.

Furthermore, to overcome the bandwidth limit due to the above-described increase in mobile data traffic, the 3GPP standard further increases the bandwidth of the cellular communication system by adopting licensed-assisted access (LAA) that sets the component carrier allocated to the SCell among the component carriers according to CA in the unlicensed band (e.g., a frequency band for Wi-Fi).

DISCLOSURE

Technical Problem

When a plurality of CAs are applied to a communication system supporting mmWave band, an electronic device needs beam tracking for each carrier or for each frequency band, it may take a long time for the electronic device to obtain a suitable beam.

In various embodiments disclosed in the specification, the electronic device may perform second beam tracking based on first beam tracking information.

Technical Solution

According to an embodiment disclosed in this specification, an electronic device may include housing, a first antenna array positioned on the housing and/or inside the housing, a second antenna array spaced from the first antenna array and positioned on the housing and/or inside the housing, at least one wireless communication circuit electrically connected to the first antenna array and the second antenna array, and at least one communication processor transmitting and/or receiving a signal through the at least one wireless communication circuit, using beamforming.

Furthermore, according to an embodiment disclosed in this specification, a method may include performing first beam tracking on a first component carrier associated with a base station, using a first antenna array, determining a first direction for beamforming for communication with the base station based at least partly on a result of the first beam tracking, and performing second beam tracking on a second component carrier based partly on the first direction, using the second antenna array. The at least one communication processor may be configured to perform first beam tracking on a first component carrier associated with a base station, using the first antenna array, to determine a first direction for beamforming for communication with the base station based at least partly on a result of the first beam tracking, and to perform second beam tracking on a second component carrier by partly using the first direction, using the second antenna array. According to an embodiment disclosed in this specification, an electronic device may include housing, a first antenna array positioned on the housing and/or inside the housing, a second antenna array spaced from the first antenna array and positioned on the housing and/or inside the housing, at least one wireless communication circuit electrically connected to the first antenna array and the second antenna array, and at least one communication processor transmitting and/or receiving a signal through the at least one wireless communication circuit, using beamforming. The at least one communication processor may be configured to start carrier aggregation, using a first frequency between 50 GHz and 70 GHz and a second frequency between 20 GHz and 45 GHz for communication with a base station, to determine whether communication using the first frequency is available, to perform beam tracking using the second frequency when the communication using the first frequency is not available, and to communicate with the base station, using the carrier aggregation when the communication using the first frequency is available.

Advantageous Effects

According to the embodiments disclosed in this specification, an electronic device may efficiently perform beamforming for a plurality of frequency bands.

Besides, a variety of effects directly or indirectly understood through the specification may be provided.

MODE FOR INVENTION

Figure 1:
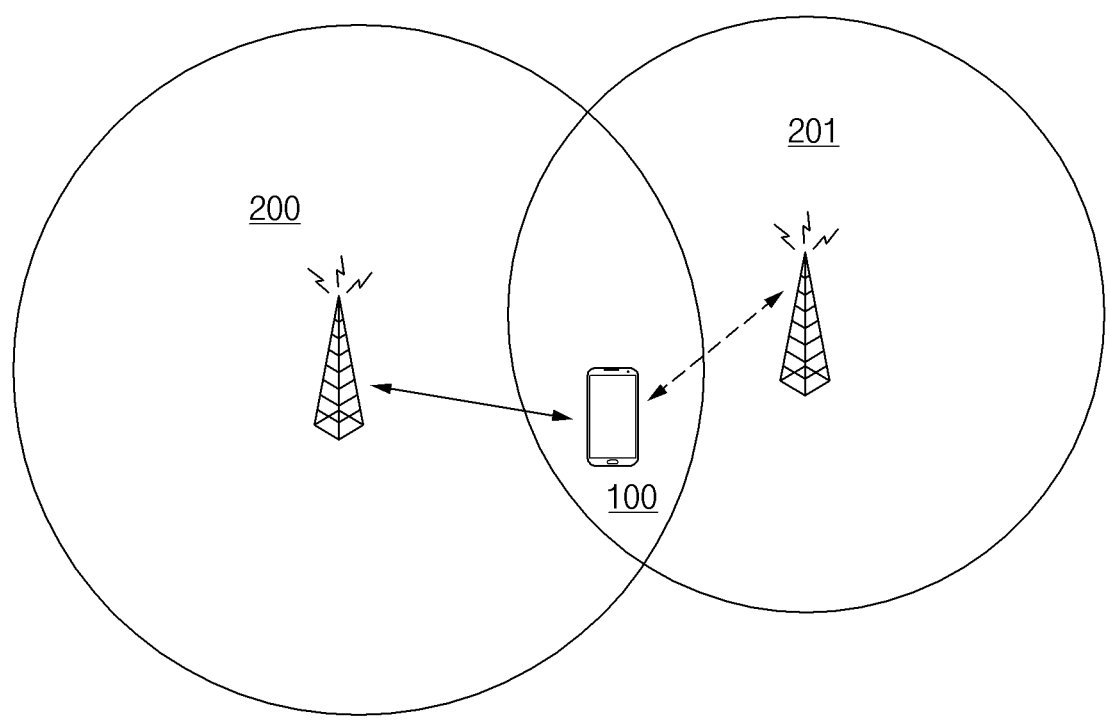
FIG. 1 illustrates a network environment according to various embodiments.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

FIG. 1 illustrates a network environment according to various embodiments. FIG. 1 illustrates an example of a network environment applicable to the disclosure.

Referring to FIG. 1, an electronic device 100 may transmit or receive a signal to or from at least one of base stations 200 and 201 over a wireless network, using a single frequency band or a plurality of frequency bands. According to an embodiment, the electronic device 100 may apply a CA technology to a plurality of frequency bands. The CA may be applied to two or more component carriers.

According to an embodiment, the electronic device 100 may set a component carrier in a plurality of frequency bands. There may be an uplink (UL) component carrier or a downlink (DL) component carrier depending on a signal transmission/reception direction, in the component carrier. UL may refer to a wireless connection for transmitting a signal from the electronic device 100 to at least one of the base stations 200 and 201; DL may refer to a wireless connection for transmitting a signal from at least one of the base stations 200 and 201 to the electronic device 100.

In the component carrier, there may have a primary component carrier (PCC) or a secondary component carrier (SCC) depending on the role of the component carrier.

While CA technology is applied, the electronic device 100 may receive signals from two or more cells simultaneously through a DL channel or may transmit signals to two or more cells simultaneously through a UL channel. According to an embodiment, one of component carriers may connect a single cell to the electronic device 100; the other of component carriers may connect another cell to the electronic device 100. In this case, a cell forming a primary component carrier with the electronic device 100 may be referred to as PCell; a cell forming a secondary component carrier with the electronic device 100 may be referred to as SCell.

According to an embodiment, a single cell may correspond to a base station. For example, the first cell may be formed by the first base station 200; and the second cell may be formed by the second base station 201. The first base station 200 and the second base station 201 may be the same or different base stations.

According to an embodiment, all of a plurality of frequency bands in each of which the component carrier is set may be licensed bands; alternatively, at least one of the frequency bands may be an unlicensed band; alternatively, all of the plurality of frequency bands may be unlicensed bands.

According to an embodiment, PCC may be set in the licensed band, and SCC may be set in the unlicensed band. As such, when SCC is set in the unlicensed band, the base station (e.g., 201) setting SCC in the unlicensed band with the electronic device 100 may be referred to as a licensed-assisted access (LAA) base station, or an LTE-unlicensed (LTE-U) base station.

According to an embodiment, at least one of the base stations 200 and 201 may be physically or logically located at the same location. In terms of the electronic device 100, the base stations 200 and 201 at the same location may be co-located base stations, and the electronic device 100 may perform operations described below on co-located base stations.

According to various embodiments, the electronic device 100 may be referred to as a terminal, user equipment (UE), a user device, or a terminal; the base station 200 or 201 may be referred to as a transmission/reception point (TRP), NodeB, evolved NodeB (eNB), gNodeB (gNB), or a base station (BS). The base station 201 that communicates with the electronic device 100 through an unlicensed band may be referred to as a base station capable of cellular communication in an unlicensed band, such as eNB, gNB, BS, or LAA base station.

According to various embodiments, the first base station 200 and the second base station 201 may be logically different base stations from each other. For example, the first base station 200 may be a base station having a logical identifier (ID) different from the ID of the second base station 201. The first base station 200 and the second base station 201 may be physically installed at the same location or may be installed at different locations.

According to an embodiment, the electronic device 100, the first base station 200, and the second base station 201 may perform operations according to standard specifications. For example, the electronic device 100, the first base station 200, and the second base station 201 may comply with 3GPP communication standard specification. At least part of operations and/or terms disclosed below may refer to the description given in the 3GPP communication standard specification.

Figure 2:
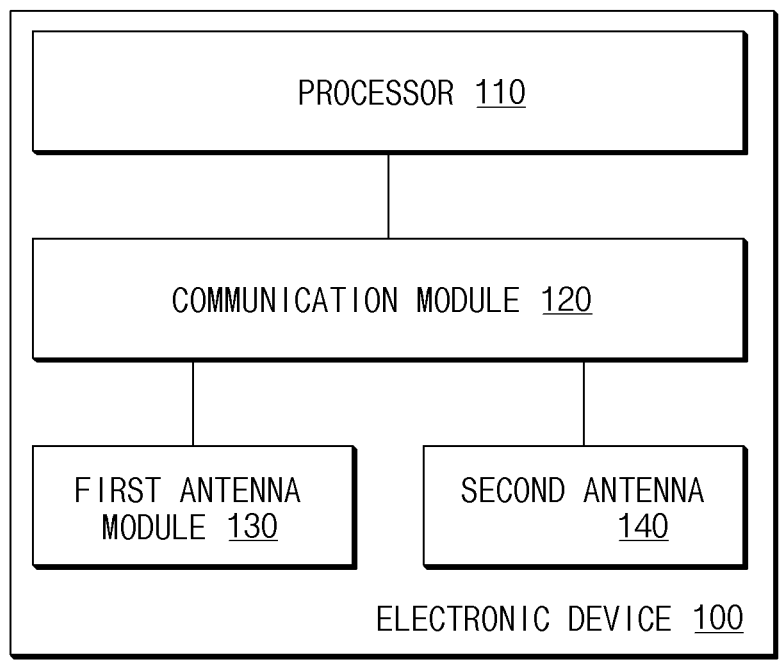
FIG. 2 is a block diagram of an electronic device according to an embodiment.

FIG. 2 is a block diagram of an electronic device according to an embodiment.

Referring to FIG. 2, the electronic device 100 may include at least one of a processor 110, a communication module 120, and a plurality of the antenna modules 130 and 140. The configuration of the electronic device 100 illustrated in FIG. 2 is an example and is variously changed to implement various embodiments disclosed in this specification. For example, the electronic device 100 may include a configuration of an electronic device 1201 illustrated in FIG. 12, or may be appropriately changed or modified by using the configurations. For example, the electronic device 100 may include a memory (not illustrated).

According to an embodiment, the processor 110 may execute various operations disclosed in the specification or may execute instructions stored in the memory (not illustrated); the processor 110 may perform an operation according to various embodiments of the disclosure or may control any other components for the purpose of performing the operation. For example, the processor 110 may deliver a control signal to the communication module 120 or the antenna modules 130 and 140.

According to an embodiment, the processor 110 may include one or more of a central processing unit, an application processor (AP), a graphic processing unit (GPU), an image signal processor of a camera, or a baseband processor (BP) (or a communication processor (CP)). According to an embodiment, the processor 110 may be implemented with a system on chip (SoC) or a system in package (SiP).

According to an embodiment, the electronic device 100 may include the first antenna module 130 and/or the second antenna module 140. The number of antenna modules illustrated in FIG. 2 is exemplary, and the number of antenna modules mounted in the electronic device 100 may vary.

According to an embodiment, the communication module 120 may be electrically connected to at least one antenna module (e.g., the first antenna module 130 or the second antenna module 140). According to an embodiment, the communication module 120 may include a baseband processor (BP), a radio frequency integrated circuit (RFIC), or an intermediate frequency integrated circuit (IFIC).

According to an embodiment, the communication module 120 may include a processor (e.g., a BP) which is independent of the processor 110 (e.g., an AP). For example, in the case where the processor 110 includes an AP and the communication module 120 includes the BP, the electronic device 100 may further include the RFIC or an IFIC as a separate module (not illustrated). In this case, the RFIC or IFIC may be electrically connected to the communication module 120, and the RFIC or IFIC may be electrically connected to the first antenna module 130 and the second antenna module 140. For another example, the BP and the RFIC or IFIC may be integrally formed with the one communication module 120. According to another embodiment, the processor 110 may include the AP and the BP, and the communication module 120 may include the IFIC or the RFIC.

According to an embodiment, the communication module 120 may include a first BP (not illustrated) or a second BP (not illustrated). The electronic device 100 may further include one or more interfaces for supporting inter-chip communication between the first BP (or the second BP) and the processor 110. The processor 110 and the first BP or the second BP may transmit/receive data by using the inter-chip interface (e.g., an inter processor communication channel).

According to an embodiment, the first BP or the second BP may provide an interface for performing communication with any other entities. The first BP may support, for example, wireless communication with regard to a first network (not illustrated). The second BP may support, for example, wireless communication with regard to a second network (not illustrated).

According to an embodiment, the first BP or the second BP may form one module with the processor 110. For example, the first BP or the second BP may be integrally formed with the processor 110.

For another example, the first BP or the second BP may be disposed in one chip or may be implemented in the form of an independent chip. According to an embodiment, the processor 110 and at least one BP (e.g., a first BP) may be integrally formed within one chip (e.g., SoC), and any other BP (e.g., a second BP) may be implemented in the form of an independent chip.

According to an embodiment, the processor 110 or the communication module 120 may transmit or receive signals in a plurality of frequency bands, using the antenna modules 130 and 140. The plurality of frequency bands may be frequency bands in each of which carriers are aggregated with each other.

According to an embodiment, the plurality of frequency bands may include a first frequency band and a second frequency band. According to an embodiment, the first frequency band may be set to PCC, and the second frequency band may be set to SCC.

According to an embodiment, at least one of the first frequency band and second frequency band may be a licensed band. According to another embodiment, at least one of the first frequency band and the second frequency band may be an unlicensed band.

According to various embodiments, the processor 110 or the communication module 120 may transmit or receive a signal in the first frequency band, using the first antenna module 130, and may transmit or receive a signal in the second frequency band, using the second antenna module 140. At this time, the processor 110 or the communication module 120 may transmit or receive a signal in the first frequency band, using an antenna array in the first antenna module 130, and may transmit or receive a signal in the second frequency band, using an antenna array in the second antenna module 140.

According to an embodiment, the first antenna module 130 or the second antenna module 140 may up-convert or down-convert a frequency. For example, the first antenna module 130 may up-convert the obtained intermediate frequency (IF) signal. For another example, the first antenna module 130 may down-convert the mmWave signal received through an antenna array (not shown) and may transmit the down-converted signal. According to an embodiment, the antenna modules 130 and 140 may transmit a signal directly to the processor 110 or may receive a signal directly from the processor 110. For example, the communication module 120 may be omitted or may be integrated in the processor 110.

For example, the operations of the communication module 120 described in the disclosure may be performed by the processor 110 and/or the antenna modules 130 and 140.

Figure 12:
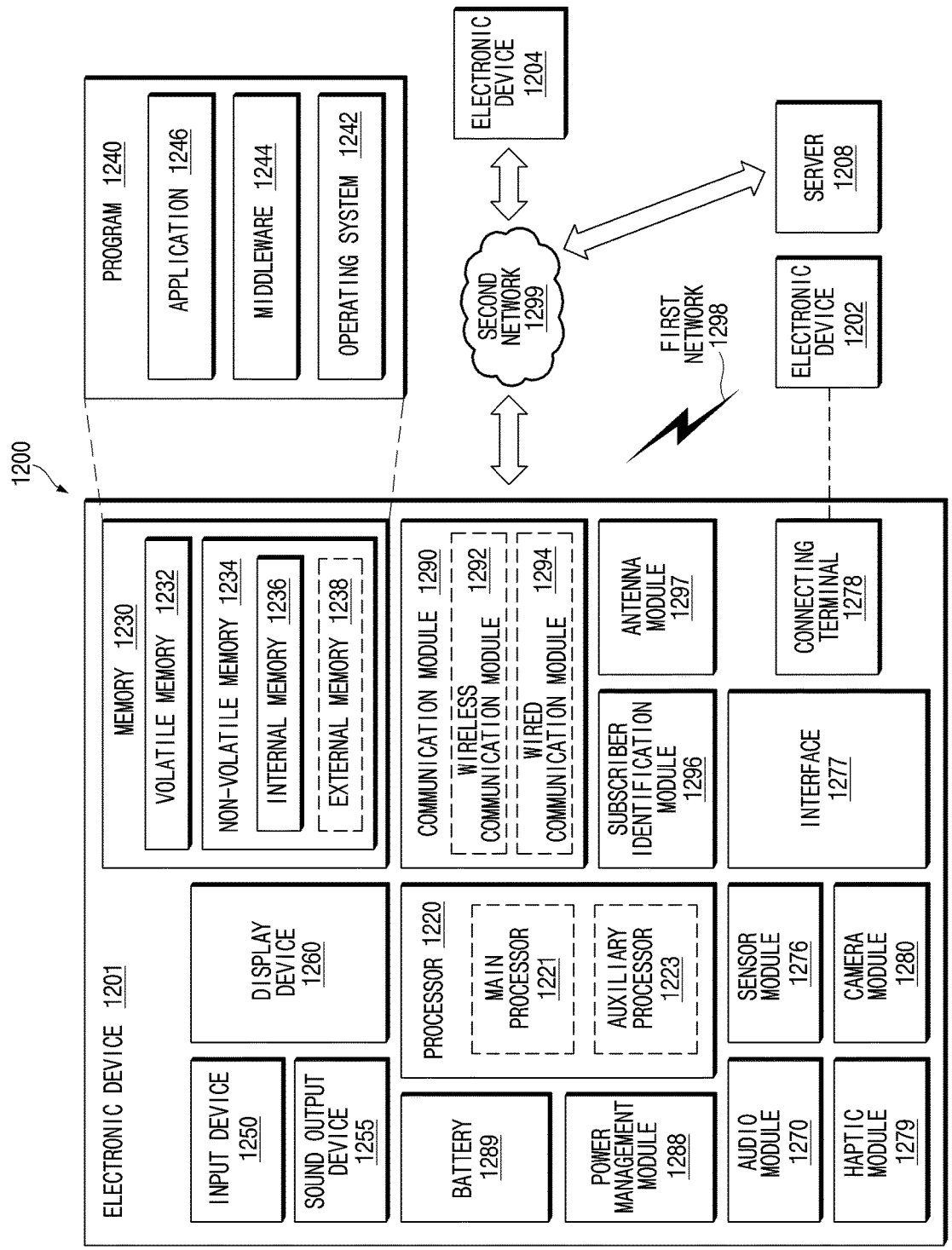
FIG. 12 is a block diagram of an electronic device in a network environment, according to various embodiments.

According to an embodiment, the first network (not illustrated) or the second network (not illustrated) may correspond to a network 1200 of FIG. 12. According to an embodiment, the first network (not illustrated) and the second network (not illustrated) may include a 4th generation (4G) network and a 5th generation (5G) network, respectively. The 4G network may support a long term evolution (LTE) protocol or an LTE-advanced (LTE-A) protocol defined in the 3rd generation partnership project (3GPP). The 5G network may support, for example, a new radio (NR) protocol defined in the 3GPP.

Figure 3:
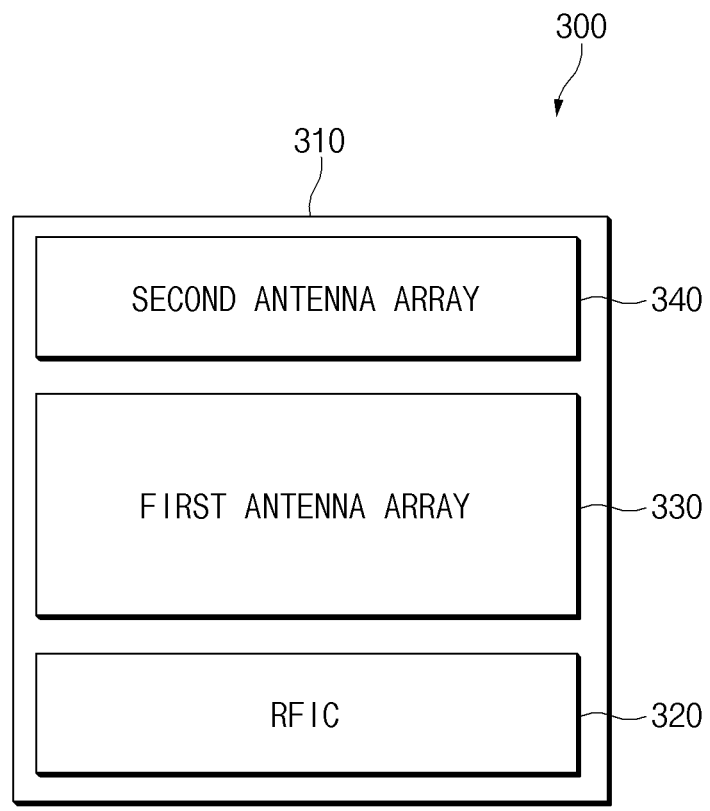
FIG. 3 illustrates a block diagram of an antenna module, according to various embodiments.

FIG. 3 illustrates a block diagram of an antenna module, according to various embodiments.

Referring to FIG. 3, an antenna module 300 (e.g., the first antenna module 130 or the second antenna module 140 in FIG. 2) may include at least one of an RFIC 320, a printed circuit board (PCB) 310, a first antenna array 330, or a second antenna array 340.

According to an embodiment, the RFIC 320, the first antenna array 330, or the second antenna array 340 may be disposed on the PCB 310. For example, the first antenna array 330 or the second antenna array 340 may be positioned on a first surface of the PCB 310, and the RFIC 320 may be positioned on a second surface of the PCB 310. For another example, the first antenna array 330 or the second antenna array 340 may be positioned on the first surface of the PCB 310, and the RFIC 320 may be positioned on the first surface.

According to an embodiment, the first antenna array 330 or the second antenna array 340 may include at least one antenna element. The at least one antenna element may include a patch antenna, a loop antenna, or a dipole antenna.

According to an embodiment, the RFIC 320 may support a radio frequency signal in a frequency band ranging from 24 GHz to 30 GHz and/or from 37 GHz to 40 GHz. For example, the RFIC 320 may support a radio frequency signal in a frequency band ranging from 3 GHz to 300 GHz. According to an embodiment, the RFIC 320 may up-convert or down-convert a frequency. For example, the RFIC 320 included in a first antenna module (e.g., the first antenna module 130 of FIG. 2) may up-convert the IF signal received from a communication module (e.g., the communication module 120 of FIG. 2) (or a separate RFIC (not shown)). For another example, the RFIC 320 may down-convert a millimeter wave (mmWave) signal received through the first antenna array 330 or the second antenna array 340 included in the first antenna module and may transmit the down-converted signal to the communication module.

Figure 4:
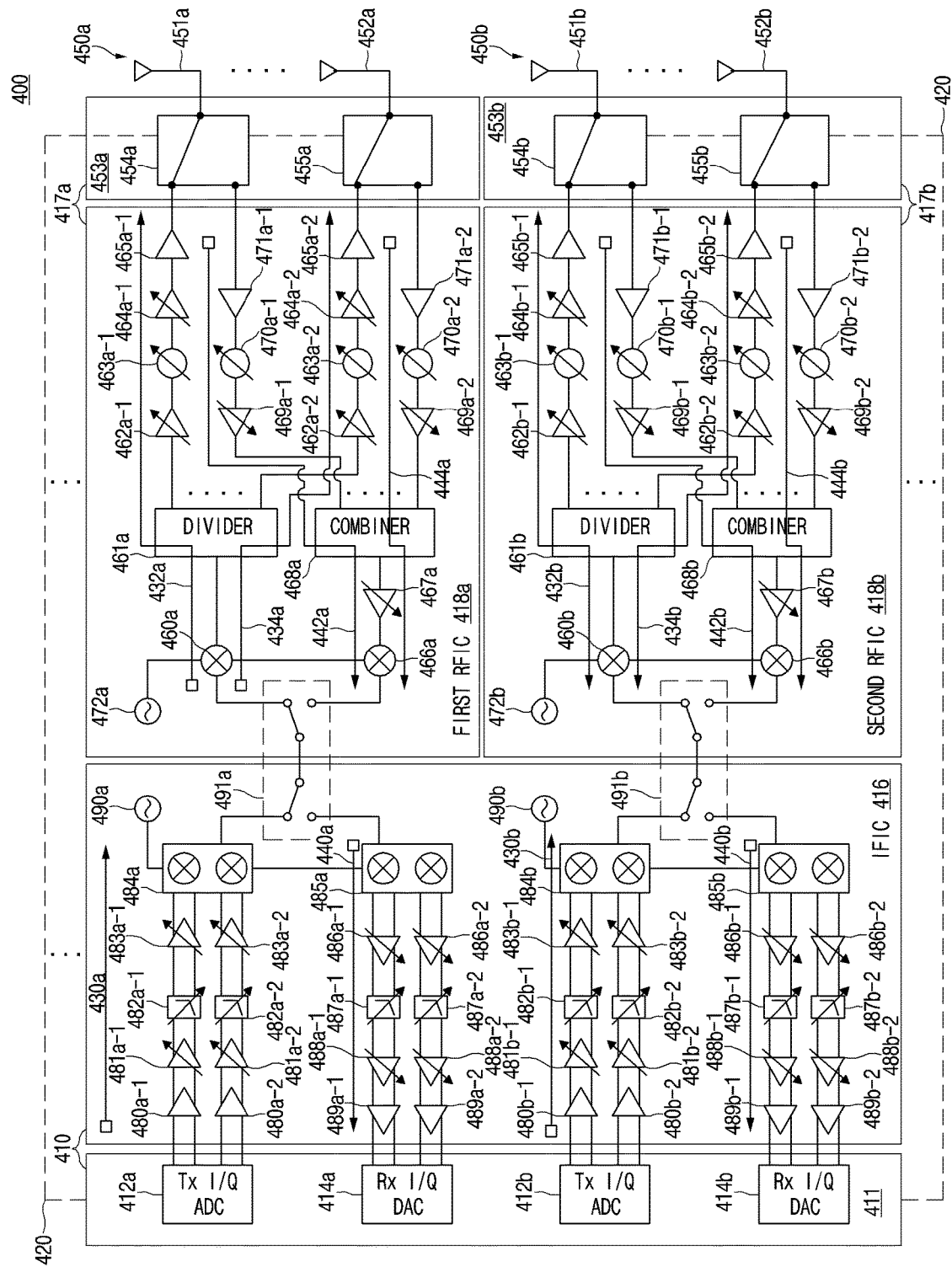
FIG. 4 illustrates a communication system of an electronic device, according to an embodiment.

FIG. 4 illustrates a device structure for communication of an electronic device according to an embodiment.

In the description of FIG. 4 described below, at least some of the functions and structures of components with the same upper reference number (e.g., '480' in 480*a*-1) but different lower reference number (e.g., 'a' or 'a-1' in 480*a*-1) may be the same as one another, and the descriptions of redundant functions may be partially omitted.

FIG. 4 illustrates a communication system 400 capable of processing at least one data stream with 'n' chains ('n' is a natural number). The communication system 400 illustrated in FIG. 4 may refer to a component including the communication module 120, the first antenna module 130, and the second antenna module 140 among the configurations of the electronic device 100 illustrated in FIG. 2. In this case, a communication module 410 may correspond to the communication module 120 of FIG. 2; a first antenna module 417*a* may correspond to the first antenna module 130 of FIG. 2; a second antenna module 417*b* may correspond to the second antenna module 140 of FIG. 2.

According to an embodiment, the communication module 410 may include a CP 411 and an IFIC 416.

According to an embodiment, the CP 411 may control other configurations of the communication system 400 for transmission and/or reception of signals. For example, the CP 411 may be electrically connected to the IFIC 416, a first RFIC 418*a*, a second RFIC 418*b* and/or path selection circuits 453*a* and 453*b*, and may control the IFIC 416, the first RFIC 418*a*, the second RFIC 418*b*, and/or the path selection circuits 453*a* and 453*b* through a control interface 420, using a control signal.

According to an embodiment, the CP 411 may include an analog to digital convertor (ADC) 412*a* and a digital to analog converter (DAC) 414*a*, which are associated with the first antenna module 417*a*, and an ADC 412*b* and a DAC 414*b*, which are associated with the second antenna module 417*b*.

According to an embodiment, the ADCs 412*a* and 412*b* may convert a transmission signal from an analog signal to a digital signal. The ADCs 412*a* and 412*b* may process I component and Q component signals of the transmission signal. The ADC 412*a* may process a signal to be transmitted through the first antenna module 417*a*, and the ADC 412*b* may process a signal to be transmitted through the second antenna module 417*b*.

According to an embodiment, the DACs 414*a* and 414*b* may convert the reception signal from a digital signal to an analog signal. The DACs 414*a* and 414*b* may process I component and Q component signals of the reception signal. The DAC 414*a* may process a signal received through the first antenna module 417*a*; the DAC 414*b* may process a signal received through the second antenna module 417*b*.

According to an embodiment, the IFIC 416 may convert the baseband signal obtained from the CP 411 into an IF signal, or may convert the IF signal obtained from the first antenna module 417*a* (or the first RFIC 418*a*) and/or the second antenna module 417*b* (or the second RFIC 418*b*) into a baseband signal. The IF signal converted by the IFIC 416 may be input to the first antenna module 417*a* and/or the second antenna module 417*b*.

According to an embodiment, the IFIC 416 may include IF transmission chains 430*a* and 430*b* and IF reception chains 440*a* and 440*b*, which are configured to process a data stream in an IF frequency band. According to an embodiment, the first IF transmission chain 430*a* and the first IF reception chain 440*a* may be selectively connected to the first antenna module 417*a* (or the first RFIC 418*a*), and the second IF transmission chain 430*b* and the second IF reception chain 440*b* may be selectively connected to the second antenna module 417*b* (or the first RFIC 418*b*). Hereinafter, the operating principle for the first IF transmission chain 430*a* and the first IF reception chain 440*a* may be applied to the operating principle for the second IF transmission chain 430*b* and the second IF reception chain 440*b*.

According to an embodiment, the first IF transmission chain 430*a* may include at least one of buffers 480*a*-1 and 480*a*-2, first variable gain amplifiers (VGAs) 481*a*-1 and 481*a*-2, low pass filters (LPFs) 482*a*-1 and 482*a*-2, second VGAs 483*a*-1 and 483*a*-2, or a quadrature mixer 484*a*.

According to an embodiment, when receiving a signal output from the CP 411, the buffers 480*a*-1 and 480*a*-2 may operate as a buffer and may stably process the signal. The signal output from the CP 411 may be a balanced I/Q signal.

According to an embodiment, the first VGAs 481*a*-1 and 481*a*-2 may perform auto gain control (AGC). The first VGAs 481*a*-1 and 481*a*-2 may perform AGC on the transmission signal under the control of the CP 411.

According to an embodiment, the LPFs 482*a*-1 and 482*a*-2 may operate as a channel filter. The LPFs 482*a*-1 and 482*a*-2 may operate in the bandwidth of the balanced I/Q signal of the baseband that is a cutoff frequency, and may operate as a channel filter. The cutoff frequency may be variable.

According to an embodiment, similarly to the first VGAs 481*a*-1 and 481*a*-2, the second VGAs 483*a*-1 and 483*a*-2 may perform AGC, and the amplification range thereof may be the same or different.

According to an embodiment, the quadrature mixer 484*a* may up-convert the obtained balanced I/Q signal. The quadrature mixer 484*a* may perform an operation by receiving the balanced I/Q signal and the signal generated by an oscillator 490*a* and may generate an IF signal.

According to an embodiment, the first IF reception chain 440*a* may include at least one of buffers 489*a*-1 and 489*a*-2, third VGAs 488*a*-1 and 488*a*-2, LPFs 487*a*-1 and 487*a*-2, fourth VGAs 486*a*-1 and 486*a*-2, or a quadrature mixer 485*a*.

According to an embodiment, when transmitting the signal output from the third VGAs 488*a*-1 and 488*a*-2 to the CP 411, the buffers 489*a*-1 and 489*a*-2 may operate as a buffer, and may stably process the signal. The signal output from the third VGAs 488*a*-1 and 488*a*-2 may be a balanced I/Q signal.

According to an embodiment, the third VGAs 488*a*-1 and 488*a*-2 may perform AGC. The third VGAs 488*a*-1 and 488*a*-2 may perform AGC on the received signal under the control of the CP 411. The amplification ranges of the third VGAs 488*a*-1 and 488*a*-2 may be the same as or different from the amplification ranges of the second VGAs 483*a*-1 and 483*a*-2 and the first VGAs 481*a*-1 and 481*a*-2.

According to an embodiment, the LPFs 487*a*-1 and 487*a*-2 may operate as a channel filter. The LPFs 487*a*-1 and 487*a*-2 may operate in the bandwidth of the balanced I/Q signal of the baseband that is a cutoff frequency. The cutoff frequency may be variable.

According to an embodiment, the fourth VGAs 486*a*-1 and 486*a*-2 may perform AGC. The amplification ranges of the fourth VGAs 486a-1 and 486a-2 may be the same as or different from the amplification ranges of the third VGAs 488a-1 and 488a-2, the second VGAs 483a-1 and 483a-2, and the first VGAs 481a-1 and 481a-2.

According to an embodiment, the quadrature mixer 485a may convert the obtained IF signal. The quadrature mixer 485a may down-convert the IF signal and may generate the balanced I/Q signal. The quadrature mixer 485a may obtain the I component signal and the Q component signal, using the signal obtained from the oscillator 490a and the IF signal.

According to an embodiment, the communication system 400 includes selection circuits 491a and 491b that selectively connect the IF transmission chains 430a and 430b or the IF reception chains 440a and 440b upon connecting the IFIC 416 and the first RFIC 418a. For example, when transmitting a signal, the CP 411 may connect the first IF transmission chain 430a in the IFIC 416 to a first RF transmission chain 432a in the first RFIC 418a. For another example, when receiving a signal, the CP 411 may connect the first IF reception chain 440a in the IFIC 416 to a first RF reception chain 442a in the first RFIC 418a.

According to an embodiment, the selection circuits 491a and 491b may include at least one switch. For example, the selection circuit 491a may include a first switch in the IFIC 416 and may include a second switch in the first RFIC 418a. In this case, while transmitting a signal, the CP 411 may allow the first and second switches to select the first IF transmission chain 430a and the first RF transmission chain 432a; while receiving a signal, the CP 411 may allow the first and second switches to select the first IF reception chain 440a and the first RF reception chain 442a. When the IF frequency is high, it may be difficult to connect a transmission line between the IFIC 416 and the RFICs 418a and 418b. The number of transmission lines may be reduced when the transmission/reception chain is connected selectively during a time division duplex (TDD) operation using the switch.

According to an embodiment, the communication module 410 may transmit or receive signals in different frequency bands through the first antenna module 417a and the second antenna module 417b. For example, the communication module 410 may transmit and/or receive a signal in a first frequency band, using a first antenna array 450a, and may transmit and/or receive a signal in the second frequency band, using a second antenna array 450b.

According to an embodiment, the first antenna module 417a may include the first RFIC 418a and the first antenna array 450a (e.g., the first antenna array 330 of FIG. 3). In this case, the first RFIC 418a may be electrically connected to the first antenna array 450a through the path selection circuit 453a.

According to an embodiment, the second antenna module 417b may be the same as or similar to the first antenna module 417a. For example, the second antenna module 417b may include the second RFIC 418b and the second antenna array 450b (e.g., the first antenna array 330 in the second antenna module 140 of FIG. 2). The second antenna module 417b may be electrically connected to the second antenna array 450b through the path selection circuit 453b. According to various embodiments, the first antenna module 417a and the second antenna module 417b may be implemented to include a plurality of antenna arrays. In the following embodiments, the configuration of the second antenna module 417b is the same as or similar to the first antenna module 417a, and thus redundant descriptions are omitted for convenience of description.

According to an embodiment, the first RFIC 418a may convert the IF signal obtained from the IFIC 416 into an RF signal or may convert the RF signal received through a plurality of antennas 451a and 452a in the first antenna array 450a into an IF signal. The RF signal may be transmitted or received through the plurality of antennas 451a and 452a. According to an embodiment, the second RFIC 418b may have the same or similar configuration as the first RFIC 418a, and may perform the same or similar operation.

According to an embodiment, the first RFIC 418a may include the first RF transmission chains 432a and 434a and the first RF reception chains 442a and 444a, which are configured to process a data stream in an RF frequency band. According to an embodiment, the first RF transmission chain 432a and the first RF reception chain 442a may be electrically connected to the antenna 451a; the first RF transmission chain 434a and the first RF reception chain 444a may be electrically connected to the antenna 452a.

According to an embodiment, the first RF transmission chain 432a may include at least one of a mixer 460a, a divider 461a, a fifth VGA 462a-1, a phase shifter 463a-1, a sixth VGA 464a-1, and a power amplifier 465a. Hereinafter, the operating principle of the components included in the first RF transmission chain 432a may be applied identically or similarly to the first RF transmission chain 434a or the second RF transmission chains 432b and 434b.

According to an embodiment, the mixer 460a may convert the IF signal obtained from the IFIC 416 into an RF signal. The mixer 460a may convert the IF signal into an RF signal using the signal generated by an oscillator 472a. The oscillator 472a may be mounted inside or outside the first RFIC 418a.

According to an embodiment, the divider 461a may divide the input signal into a plurality of signals. The plurality of signals divided by the divider 461a may be delivered to the plurality of antennas 451a and 452a, respectively.

According to an embodiment, the fifth VGA 462a-1 may perform AGC. The fifth VGA 462a-1 may obtain a control signal for performing AGC from the CP 411.

According to an embodiment, the sixth VGA 464a-1 may perform AGC. FIG. 4 illustrates that the number of VGAs in the first RF transmission chain 432a is two, but the number of VGAs may be variously modified. For another example, the amplification ranges of the fifth VGA 462a-1 and the sixth VGA 464a-1 may be the same or different.

According to an embodiment, the phase shifter 463a-1 may shift the phase of a signal. The phase shifter 463a-1 may obtain a control signal from the CP 411 and may shift the phase depending on the control signal. The phase shifter 463a-1 may shift the phase of an input signal depending on the beamforming angle (or direction).

According to an embodiment, the power amplifier 465a-1 may amplify the power of the signal output from the phase shifter 463a-1.

According to an embodiment, at least one of the fifth VGA 462a-1, the phase shifter 463a-1, the sixth VGA 464a-1, and the power amplifier 465a-1 may be mounted inside or outside the first RFIC 418a.

According to an embodiment, the first RF reception chain 442a may include at least one of a low noise amplifier (LNA) 471a-1, a phase shifter 470a-1, a seventh VGA 469a-1, a combiner 468, an eighth VGA 467a, and a mixer 466a. The configurations may be mounted inside the first RFIC 418a. Hereinafter, the operating principle of the components included in the first RF reception chain 442a may be applied identically or similarly to the first RF reception chain 444a or the second RF reception chains 442b and 444b.

According to an embodiment, the LNA 471a-1 may perform low-noise amplification of the signal received from the plurality of antennas 451a and 452a.

According to an embodiment, the phase shifter 470a-1 may shift the phase of the signal depending on the beamforming angle. The phase shifter 470a-1 may align a signal phase between the plurality of first RF reception chains 442a and 444a within the same or similar range. The phase shifter 470a-1 may operate under the control of the CP 411.

According to an embodiment, the seventh VGA 469a-1 may perform reception AGC. The number of the seventh VGA 469a-1 may be variously modified according to various embodiments.

According to an embodiment, the combiner 468a may combine signals obtained from the plurality of antennas 451a and 452a. The signal output from the combiner 468a may be delivered to the mixer 466a through the eighth VGA 467a. The mixer 466a may convert the received RF signal into an IF signal. The mixer 466a may down-convert the RF signal, using the signal obtained from the oscillator 472a.

According to an embodiment, the IF transmission chain and the RF transmission chain may be referred to as a transmission chain; the IF reception chain and the RF reception chain may be referred to as a reception chain. For example, the first IF transmission chain 430a and the first RF transmission chain 432a (or the first RF transmission chain 434a) may be referred to as a first transmission chain; the first IF reception chain 440a and the first RF reception chain 442a (or the first RF reception chain 444a) may be referred to as a first reception chain.

According to an embodiment, the plurality of antennas 451a and 452a may form the antenna array 450a arranged in an array. FIG. 4 illustrates that the plurality of antennas 451a and 452a are included in the first antenna module 417a, but this is not limited thereto, and the various numbers of antennas may be disposed in the first antenna module 417a.

According to an embodiment, the plurality of antennas 451a and 452a may deliver the obtained signal to the first RFIC 418a or may transmit the signal processed by the first RFIC 418a. The plurality of antennas 451a and 452a may be electrically connected to the first RF transmission chains 432a and 442a or the first RF reception chains 434a and 444a in the first RFIC 418a. For example, the antenna 451a may be electrically connected to the first RF transmission chain 432a or the first RF reception chain 434a; the antenna 452a may be electrically connected to the first RF transmission chain 434a or the first RF reception chain 444a.

According to an embodiment, the plurality of antennas 451a and 452a may be selectively electrically connected to the first RF transmission chains 432a and 434a or the first RF reception chains 442a and 444a in the first RFIC 418a. To this end, the first antenna module 417a may include the path selection circuit 453a. While transmitting a signal, the path selection circuit 453a may connect the plurality of antennas 451a and 452a to the first RF transmission chains 432a and 434a; while receiving a signal, the path selection circuit 453a may connect the plurality of antennas 451a and 452a to the first RF reception chains 442a and 444a. The path selection circuit 453a or the internal configuration thereof may operate under the control of the CP 411. The path selection circuit 453a may operate to transmit or receive signals depending on time in a time division duplex (TDD) system. The plurality of antennas 451a and 452a may be connected to a duplexer (not illustrated). In this case, the communication system 400 may operate in a frequency division duplex (FDD) scheme.

According to an embodiment, the CP 411 may control at least one of the IFIC 416, the first RFIC 418a, the second RFIC 418b, and the path selection circuits 453a and 453b through the control interface 420. For example, the control interface 420 may be a communication interface including at least one of a mobile industry processor interface (MIPI), an inter-integrated circuit (I2C), a peripheral component interconnect express (PCIe), a universal asynchronous receiver/transmitter (UART), a universal serial bus (USB) and/or a general-purpose input/output (GPIO).

Although not illustrated in FIG. 4, a control interface for delivering a control signal may be included in the integrated circuit (e.g., the first communication circuit 416 or the RFICs 418a and 418b).

Figure 5:
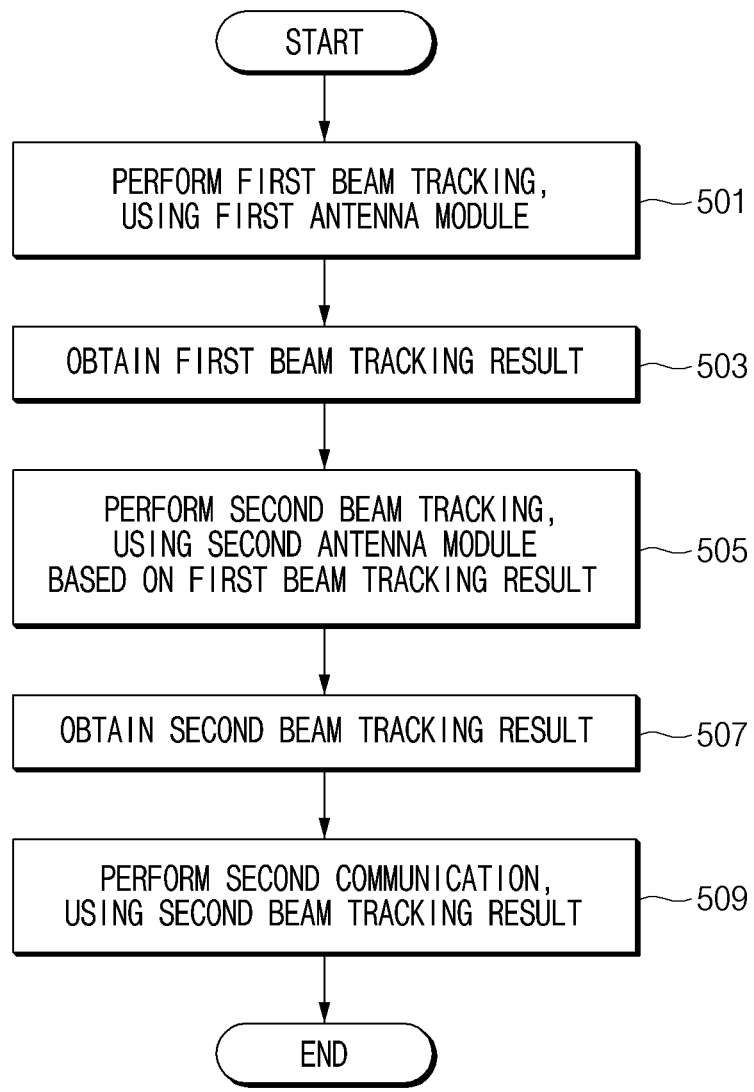
FIG. 5 is an operation flowchart illustrating a method, in which an electronic device performs beamforming, according to an embodiment.

FIG. 5 is an operation flowchart illustrating a method, in which an electronic device performs beamforming, according to an embodiment.

The operation illustrated in FIG. 5 may be performed by an electronic device (e.g., the electronic device 100 of FIG. 1). Each operation is stored in a memory (e.g., the memory 1230 of FIG. 12) in the form of instructions and may be executed by a processor. The processor may be the processor 110 or a processor in the communication module 120 in FIG. 2. For example, the processor may include a CP.

Referring to FIG. 5, an electronic device may support CA. When communicating with a plurality of cells (or base stations) to which CA is applied, the electronic device may perform first beam tracking to obtain a first beam for communicating with a single cell, and may perform second beam tracking to obtain a second beam for communicating with another cell based on the first beam tracking result.

In operation 501, the electronic device may perform first beam tracking, using a first antenna module (e.g., the first antenna module 130 in FIG. 2). The first beam tracking may be an operation for searching for a first beam for communicating with a first cell among a plurality of cells (or using resources associated with the first cell). The electronic device may establish a communication connection with the first cell among a plurality of cells, using the first antenna module. The electronic device may perform first beam tracking to search for a first beam suitable to communicate with the first cell. According to an embodiment, the first cell is a PCell, and the communication with the PCell may be referred to as PCell communication. The electronic device may transmit or receive a signal for beam tracking upon performing beam tracking. For example, an electronic device may transmit or receive a reference signal.

In operation 503, the electronic device may obtain the first beam tracking result. The first beam tracking result may include information (e.g., a parameter value) related to the first beam. The electronic device may communicate with the first cell through the first antenna module, using the first beam tracking result. The electronic device may form a first beam (or a beam pattern), using the first beam tracking result upon communicating with the first cell. The electronic device may transmit a signal, which has a first beam and includes data, to the first cell, or may receive the signal from the first cell.

In operation 505, the electronic device may perform second beam tracking, using a second antenna module (e.g., the second antenna module 140 of FIG. 2) based on the first beam tracking result. The second beam tracking may be an operation for searching for a second beam for communication with the second cell, not the first cell, among a plurality of cells (or using resources associated with the second cell).

The CA may be applied to the first cell and the second cell. For example, the frequency band of the first cell may be different from the frequency band of the second cell, or the frequency band of the first cell may be at least partly overlap with the frequency band of the second cell.

The electronic device may establish a communication connection with a second cell among a plurality of cells, using the second antenna module. The electronic device may perform second beam tracking to search for a second beam suitable to communicate with the second cell. According to an embodiment, the second cell is SCell, and communication with the SCell may be referred to as SCell communication.

According to an embodiment, the electronic device may perform the second beam tracking based on the first beam tracking result. The electronic device may use the first beam tracking result upon starting second beam tracking. For example, the electronic device may set the first beam tracking result as an initial value of the second beam tracking.

In operation 507, the electronic device may obtain the second beam tracking result. The second beam tracking result may include information associated with the second beam.

In operation 509, the electronic device may perform the second communication (e.g., data communication) (or communication with the second cell) through the second antenna module, using the second beam tracking result. The electronic device may form a second beam (or beam pattern), using the second beam tracking result upon communicating with the second cell.

According to an embodiment, the base stations forming the first cell and the second cell may be co-located base stations. For example, the base stations may be base stations physically located at the same location.

Figure 6:
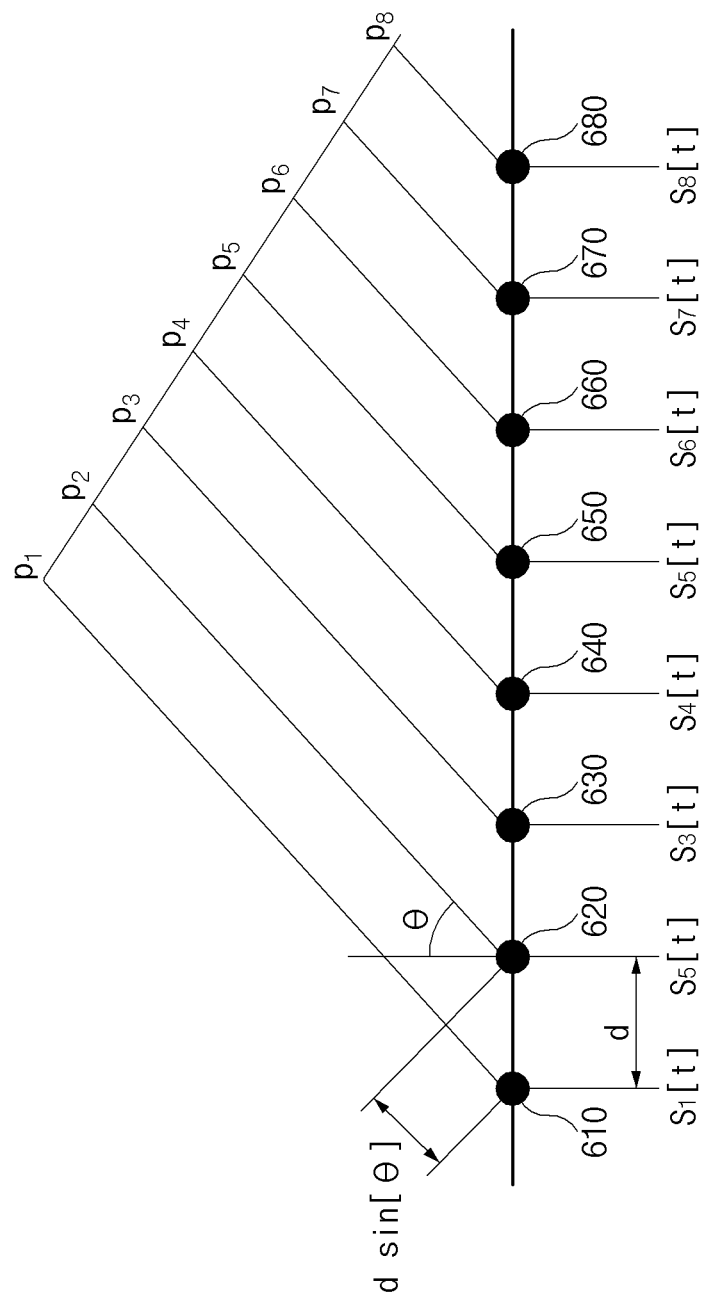
FIG. 6 is a diagram illustrating an operation of performing beamforming using an antenna module according to an embodiment.

FIG. 6 is a diagram illustrating an operation of performing beamforming using an antenna module according to an embodiment.

According to an embodiment, an antenna module (e.g., the first antenna module 130 of FIG. 2) may include a plurality of antenna elements 610, 620, 630, 640, 650, 660, 670, and 680 (e.g., the plurality of antenna elements 451a and 452a of FIG. 4). When electricity is supplied, the plurality of antenna elements 610, 620, 630, 640, 650, 660, 670, and 680 may operate as antennas, respectively. For example, the plurality of antenna elements 610, 620, 630, 640, 650, 660, 670, and 680 may be arranged in an array at regular intervals to form an antenna array (e.g., the first antenna array 450a of FIG. 4).

According to an embodiment, to perform beam steering on the plurality of antenna elements 610, 620, 630, 640, 650, 660, 670, and 680, the electronic device may apply the same signal with different phases to all the antenna elements 610, 620, 630, 640, 650, 660, 670, and 680, and may apply a phase delay according to Equation 1 and Equation 2 below between adjacent antenna elements (e.g., between 610 and 620 or between 630 and 640).

$$\tau = \frac{d\sin(\theta)}{c} \quad \text{Equation 1}$$

$$\frac{2\pi f a \sin(\theta)}{c} = 2\pi f \tau \quad \text{Equation 2}$$

In Equation 1, $\tau$ may denote a delay time; d may denote the distance between antenna elements; $\theta$ may denote a beamforming angle; c may denote the speed of light of a signal.

Equation 2 represents the phase delay. Here, f may be the frequency of a signal.

The electronic device may perform beamforming by applying a phase delay between antennas during beam steering.

Figure 7:
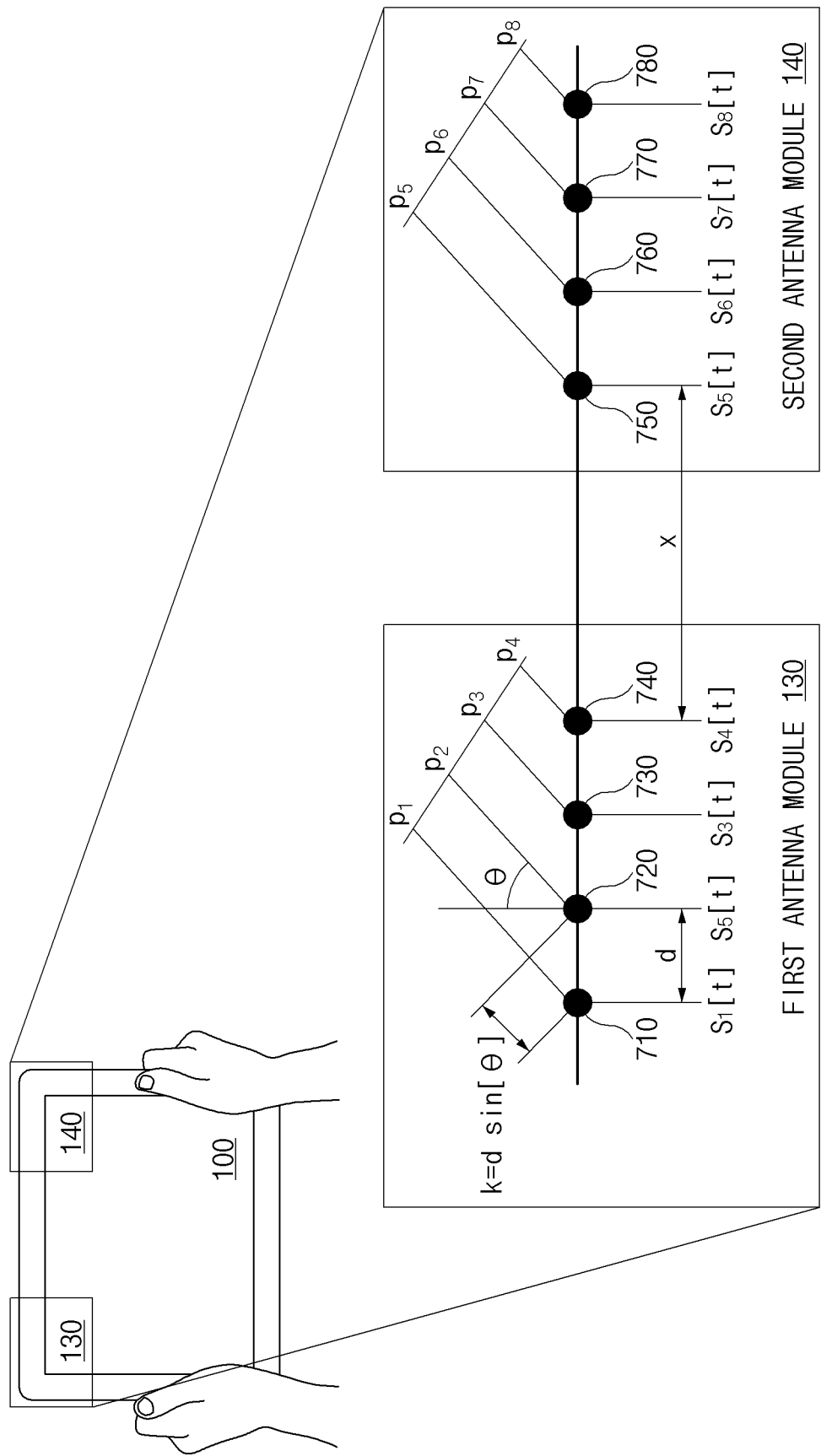
FIG. 7 is a diagram illustrating an operation, in which an electronic device performs beamforming on a plurality of antenna modules, according to an embodiment.

FIG. 7 is a diagram illustrating an operation, in which an electronic device performs beamforming on a plurality of antenna modules, according to an embodiment.

An operation, in which the electronic device 100 performs beam tracking using the first antenna module 130 and the second antenna module 140 in a CA situation, will be described with reference to FIG. 7. The electronic device 100 may perform first beam tracking on a first cell, using the first antenna module 130, and may perform second beam tracking on a second cell, using the first beam tracking result.

Referring to FIG. 7, the electronic device 100 may include the first antenna module 130 and the second antenna module 140. The first antenna module 130 may include a plurality of first antenna elements 710, 720, 730, and 740 (e.g., the plurality of antennas 451a and 452a of FIG. 4); the second antenna module 140 may include a plurality of second antenna elements 750, 760, 770, and 780 (e.g., the plurality of antennas 451b and 452b of FIG. 4).

According to an embodiment, in the first antenna module 130, the plurality of first antenna elements 710, 720, 730, and 740 may be spaced from each other at a constant interval, and may be arranged in an array. The plurality of first antenna elements 710, 720, 730, and 740 may form an antenna array. In the second antenna module 140, the plurality of second antenna elements 750, 760, 770, and 780 may be spaced from each other at a constant interval, and may be arranged in an array. The plurality of second antenna elements 750, 760, 770, and 780 may form an antenna array.

The plurality of first antenna elements 710, 720, 730, and 740 may include the first antenna element 710, the second antenna element 720, the third antenna element 730, and the fourth antenna element 740. According to various embodiments, the number of antenna elements may be variously modified.

Assuming that the first to fourth antenna elements 710 to 740 are spaced from one another by a constant distance d, the phase difference between signals in the first antenna module 130 may be expressed by Equation 3 below.

$$\frac{2\pi f_1 d\sin(\theta)}{c} \quad \text{Equation 3}$$

Here, $f_1$ may be the frequency of a first component carrier (CC). The first CC may be PCC.

According to an embodiment, the electronic device 100 may form a starting point of the second beam tracking in substantially the same direction as the first beam. For example, when the first beam tracking result indicates the first beam angle (or the first beam direction), $\theta$ found as the result of Equation 3 may be applied, at the start of second beam tracking or as an initial value. For example, when transmitting the first beam during second beam tracking, the electronic device may apply a phase delay between a plurality of second antenna elements 750, 760, 770, and 780 in the second antenna module 140 as shown in Equation 4 below.

$$\frac{2\pi f_2 d\sin(\theta)}{c} \quad \text{Equation 4}$$

Here, $f_2$ may be the frequency of a second CC. The second CC may be SCC. According to an embodiment, when the TRP positions of PCC and SCC are the same as each other upon performing the second beam tracking, the electronic device may succeed in second beam tracking at once; when the positions are different from each other, the electronic device may quickly perform the second beam tracking.

According to an embodiment, the first antenna module 130 and the second antenna module 140 may be spaced by a predetermined distance (x). In this case, the spaced distance (x) may affect the formation of the beam at the starting point of the second beam tracking. For example, the initial value of the second beam tracking may be determined based on the first beam tracking result and/or the spaced distance between the first antenna module 130 and the second antenna module 140.

According to an embodiment, to adjust the angle (or direction) of the beam generated by the first antenna module 130 and the second antenna module 140, the electronic device 100 may control a phase shifter (e.g., the phase shifters 463a-1 and 470a-1 of FIG. 4). A single antenna element (or antenna) may be electrically connected to a single phase shifter. In FIG. 4, the single antenna element may be connected to a single phase shifter depending on an operation of a path selector to form a single RF path.

Figure 8:
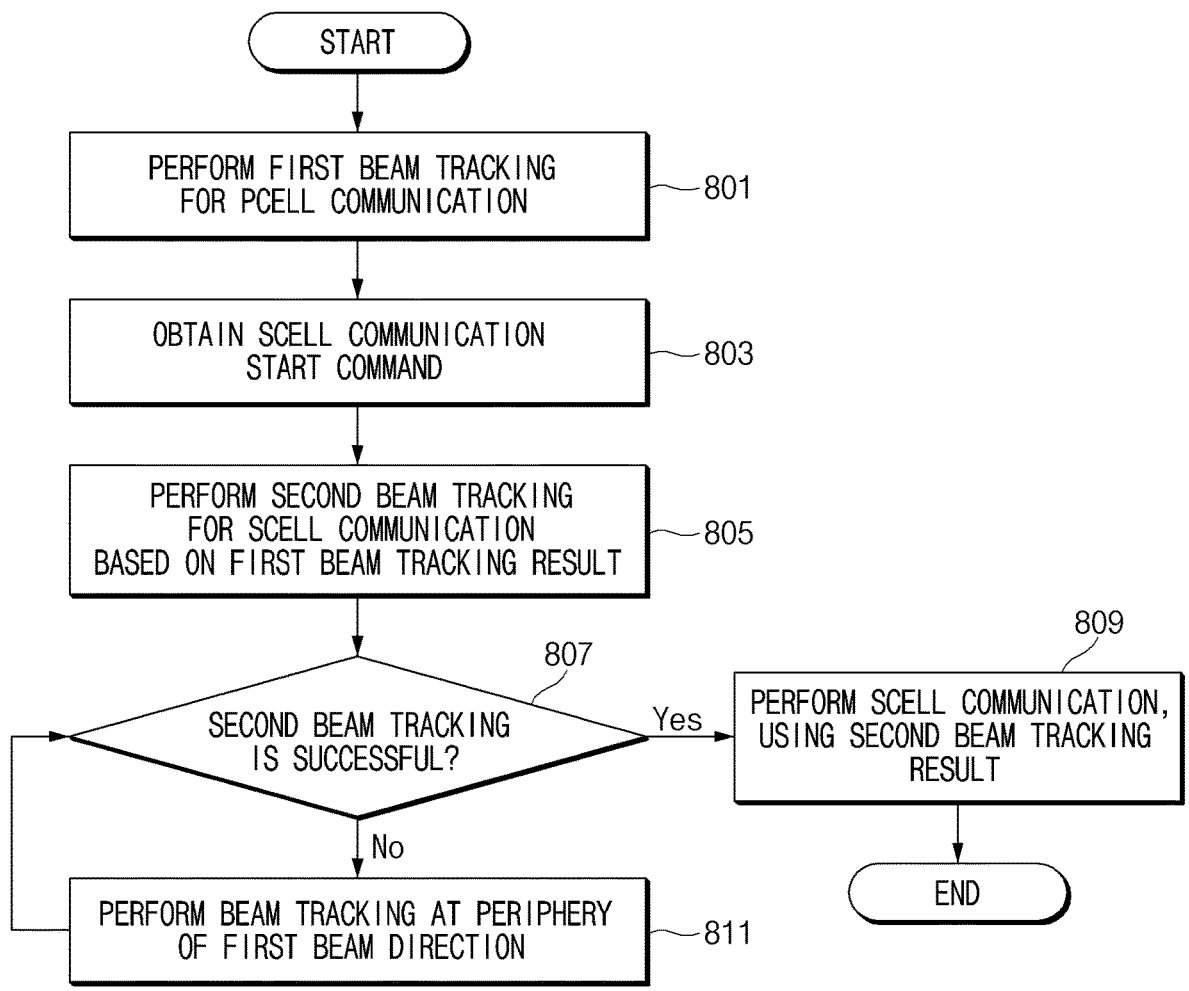
FIG. 8 is a flowchart of an operation, in which an electronic device performs second beam tracking in a communication situation, according to an embodiment.

FIG. 8 is a flowchart of an operation, in which an electronic device performs second beam tracking in a communication situation, according to an embodiment.

The operation illustrated in FIG. 8 may be performed by an electronic device (e.g., the electronic device 100 of FIG. 1). Each operation is stored in a memory (e.g., the memory 1230 of FIG. 12) in the form of instructions and may be executed by a processor. The processor may be the processor 110 or a processor in the communication module 120 in FIG. 2. For example, the processor may include a CP.

Referring to FIG. 8, an electronic device may be applied during beam tracking for SCell, using a beam tracking result for PCell. Beam tracking for a specific cell may mean performing beam tracking on a component carrier associated with the corresponding cell. According to various embodiments, the beam tracking may include an operation in which an electronic device receives a reference signal (RS) of a base station or monitors the RS.

In operation 801, the electronic device may perform first beam tracking for PCell communication. The PCell communication may mean performing communication through the PCC formed between PCell and the electronic device. For example, the PCell communication may include an operation of transmitting or receiving a control channel and/or data channel through PCC. The electronic device may set the PCC, using the first antenna module (e.g., the first antenna module 130 in FIG. 2). The electronic device may monitor at least one of synch signal PBCH block (SSB) and RS, and may track a first beam associated with the SSB or the RS. The electronic device may obtain the first beam tracking result. The first beam tracking result may be applied to communication with the PCell. The first beam tracking result may include information associated with the beam. The information associated with the beam may include a phase parameter for forming a specific beam angle upon transmitting or receiving a signal. The phase parameter may be applied to a phase shifter. As the first beam tracking result, the phase parameter may have a first value.

In operation 803, the electronic device may obtain a SCell communication start command (or request). The SCell communication start command may be obtained from a base station forming a PCell (or from a PCell), or may be obtained in response to a user's request. Alternatively, the electronic device may generate a SCell communication start command depending on a communication situation.

In operation 805, the electronic device may perform second beam tracking for SCell communication based on the first beam tracking result. The electronic device may perform the second beam tracking, using a second antenna module (e.g., the second antenna module 140 of FIG. 2). The electronic device may set SCC, using the SCell and the second antenna module. When the electronic device transmits the first signal forming a specific beam pattern after starting the second beam tracking, the electronic device may apply the first beam tracking result. For example, the first value may be applied to a phase shifter and may transmit the signal.

In operation 807, the electronic device may determine whether the second beam tracking is successful. When the second beam tracking is successful, the electronic device performs operation 809; when the second beam tracking fails, the electronic device may perform operation 811.

According to various embodiments, the electronic device may determine whether the second beam tracking is successful, based on the signal reception strength of SSB or RS. For example, when the received SSB or RS signal reception strength satisfies a specified threshold (e.g., when the received SSB or RS signal reception strength is greater than or is not less than the threshold), the electronic device may determine that the second beam tracking is successful. When determining that the received SSB or RS signal reception strength is less than the specified threshold, the electronic device may determine that the second beam tracking has failed.

In operation 809, the electronic device may perform SCell communication, using the second beam tracking result. The electronic device may perform the SCell communication, using information associated with the second beam obtained as the second beam tracking result. For example, the electronic device may transmit or receive a signal through the SCC, using the result of second beam tracking. In this case, the electronic device may transmit or receive the signal, using the second antenna module.

In operation 811, the electronic device may perform the second beam tracking at a periphery of the first beam direction. For example, when the beam formation result in the same direction as the first beam obtained as the first tracking result indicates that the corresponding beam is not suitable for SCell communication, the electronic device may perform second beam tracking at a periphery of the first beam. In this case, the electronic device may perform second beam tracking while changing the phase parameter value applied to the phase shifter into a value in a range close to the phase parameter applied to form the first beam. For example, when the phase of the phase shifter is capable of being adjusted in units of 45 degrees, the electronic device may apply a phase parameter changed by 45 degrees from the phase parameter applied to form the first beam. The electronic device may repeat operation 807 after performing operation 811.

Figure 9A:
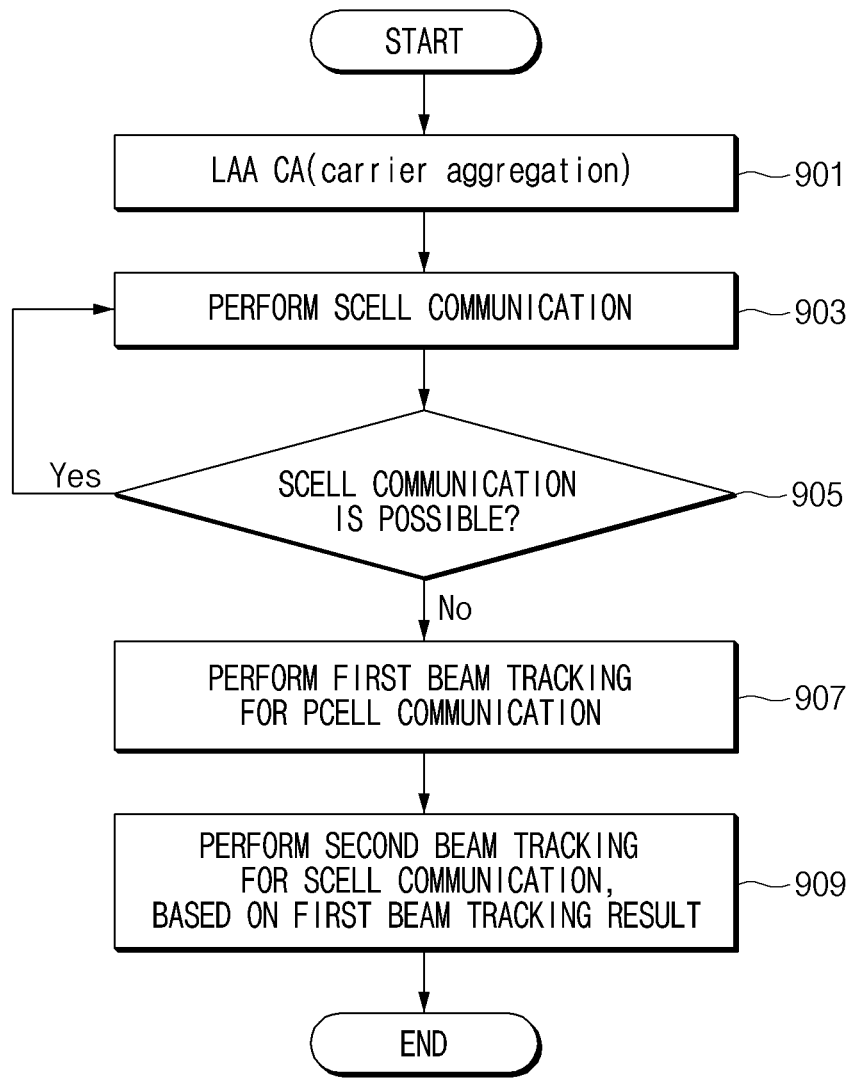
FIGS. 9A and 9B are flowcharts of an operation, in which an electronic device performs second beam tracking in a communication situation, according to various embodiments.
Figure 9B:
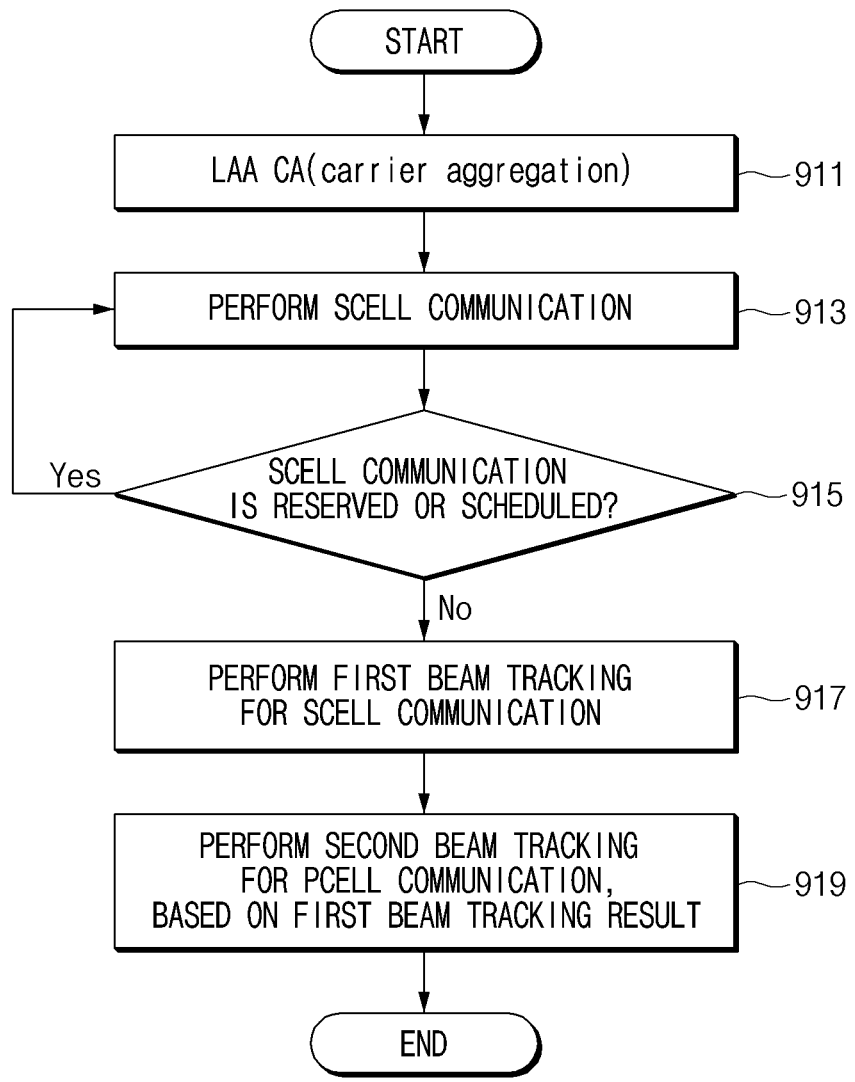

FIGS. 9A and 9B are flowcharts of an operation, in which an electronic device performs second beam tracking in a communication situation, according to an embodiment.

The operation illustrated in FIGS. 9A and 9B may be performed by an electronic device (e.g., the electronic device 100 of FIG. 1). Each operation is stored in a memory (e.g., the memory 1230 of FIG. 12) in the form of instructions and may be executed by a processor. The processor may be the processor 110 or a processor in the communication module 120 in FIG. 2. For example, the processor may include a CP.

Referring to FIGS. 9A and 9B, while a single CC is not performing communication in a CA situation, the electronic device may perform beam tracking in an auxiliary manner such that another CC may stably perform beamforming.

Referring to FIG. 9A, when the electronic device fails perform SCell communication while performing the SCell communication, the electronic device may perform first beam tracking in an auxiliary manner on PCC in preparation for resuming the SCell communication. When performing the SCell communication again, the electronic device may perform second beam tracking, using the first beam tracking result.

The following embodiment is exemplified as an electronic device fails to occupy SCC because the unlicensed band is busy during the SCell communication when PCC is set on licensed band and SCC is set in an unlicensed band.

In operation 901, the electronic device may apply licensed-assisted access (LAA) CA. For example, the electronic device may set PCC in the licensed band, and may set SCC in the unlicensed band.

In operation 903, the electronic device may perform SCell communication. According to an embodiment, the electronic device may not perform PCell communication, but may perform only the SCell communication. For example, the electronic device may be in communication with a base station (e.g., the base station 201 of FIG. 1) in only the unlicensed band.

In operation 905, the electronic device may determine whether the SCell communication is possible. For example, the electronic device may determine whether the unlicensed band is busy. For example, the electronic device may determine whether the unlicensed band is occupied by another electronic device, base station, or communication channel. When the unlicensed band is in a busy state, the electronic device may determine that SCell communication is not possible; when the unlicensed band is in an idle state, the electronic device may determine that SCell communication is possible. According to an embodiment, the electronic device may determine whether the unlicensed band is occupied, based on the signal reception strength in the unlicensed band. In addition, the electronic device may determine whether the unlicensed band is occupied, based on various schemes.

When the SCell communication is possible, the electronic device may repeat operation 903; when the SCell communication is impossible, the electronic device may perform operation 907. When the SCell communication is possible, the electronic device may simultaneously perform both the PCell communication and SCell communication.

In operation 907, the electronic device may perform first beam tracking for PCell communication. The electronic device may perform the first beam tracking, using a first communication device and may obtain the first beam tracking result. The first beam tracking may be performed in the licensed band. The electronic device may perform the first beam tracking in response to an operation of determining that the unlicensed band is in a busy state.

In operation 909, the electronic device may perform the second beam tracking associated with the SCell communication, based on the first beam tracking result. When resuming the SCell communication, the electronic device may perform the second beam tracking. For example, the electronic device may perform the second beam tracking in response to an operation of determining that the unlicensed band is in an idle state. After the SCell communication is stopped, the electronic device may continuously monitor the unlicensed band.

The embodiment of FIG. 9A may be variously modified. Even when performing only the SCell communication, the electronic device may maintain a PCell communication connection. In this case, when interrupting the SCell communication, the electronic device may immediately communicate with the PCell; while performing the SCell communication, the electronic device may continuously perform first beam tracking. When the electronic device continuously performs the first beam tracking even though the electronic device moves to another location upon interrupting the SCell communication, the electronic device may efficiently perform second beam tracking upon resuming the SCell communication.

Referring to FIG. 9B, when the electronic device performs the SCell communication and then the SCell communication is not reserved or scheduled, the electronic device may perform the first beam tracking for the corresponding SCell communication, and may use the result of the first beam tracking during the second beam tracking for the PCell communication.

In operation 911, the electronic device may apply LAA CA. For example, the electronic device may set PCC in the licensed band, and may set SCC in the unlicensed band.

In operation 913, the electronic device may perform SCell communication. According to an embodiment, the electronic device may or may not perform the PCell communication.

In operation 915, the electronic device may determine whether the SCell communication is reserved or scheduled. According to an embodiment, the electronic device may determine whether the SCell communication is reserved or scheduled to be performed during a specific period. For example, the electronic device may determine whether data transmission is expected from the SCell, SCell resource occupancy status, or the like.

When the SCell communication is reserved or scheduled, the electronic device may repeat operation 913; when the SCell communication is not reserved or scheduled, the electronic device may perform operation 917.

In operation 917, the electronic device may perform first beam tracking for SCell communication. The electronic device may perform the first beam tracking for the SCell communication to perform PCell communication later. The electronic device may perform the first beam tracking through SCC and may obtain the first beam tracking result. The first beam tracking may be performed in the unlicensed band.

In operation 919, the electronic device may perform second beam tracking for PCell communication, based on the first beam tracking result. The electronic device may perform the second beam tracking through PCC and may obtain the second beam tracking result. When the electronic device resumes SCell communication using the second beam tracking, the electronic device may perform the second beam tracking. For example, the electronic device may perform the second beam tracking in response to an operation of determining that the unlicensed band is in an idle state. After the SCell communication is stopped, the electronic device may continuously monitor the unlicensed band.

The embodiment of FIG. 9 may be modified in various manners. Even when performing only the SCell communication, the electronic device may maintain a PCell communication connection. In this case, when interrupting the SCell communication, the electronic device may immediately communicate with the PCell; while performing the SCell communication, the electronic device may continuously perform first beam tracking. When the electronic device continuously performs the first beam tracking even though the electronic device moves to another location upon interrupting the SCell communication, the electronic device may efficiently perform second beam tracking upon resuming the SCell communication.

According to an embodiment, when the base stations respectively forming the PCell and SCell are co-located with each other, the electronic device may perform the above-described operations. In this case, the operation in which the electronic device determines that the base station is co-located will be described later.

According to an embodiment, the network may define co-locate signaling. For example, the base station may transmit a control signal including information about co-locate to the electronic device. The control signal may be a radio resource control (RRC) signal.

According to an embodiment, the electronic device may transmit a control signal including information about beam correspondence to a base station. The signal may be an RRC signal.

According to an embodiment, after the electronic device sets PCC, the network may allow the electronic device to set SCC through RRC signaling. The network may inform UE whether PCC and SCC (or PCell and SCell) is co-located, through RRC signaling. For example, information associated with co-locate having 1 bit may be included in the RRC signal. Both PCC and SCC may be set in a licensed band (licensed spectrum); both PCC and SCC may be set in the unlicensed band; PCC and SCC may be set in the licensed band and the unlicensed band, respectively.

According to an embodiment, when the information associated with the co-locate indicates that PCell and SCell are co-located, the electronic device may assume that signals received through PCC and SCC are spatially quasi-colocated (QCL).

According to an embodiment, to grasp the relationship between PCell and SCell, and the relationship between signals received from PCell and SCell, the electronic device may manage and/or maintain a table associated with the correlation between CC and a beam.

For example, when it is possible to perform RRC set five CCs CC1, CC2, CC3, CC4, and CC5 in a single electronic device, CC1 to CC3 are co-located, and CC4 to CC5 are not co-located, the electronic device may manage whether CCs are quasi-colocated (QCL), as illustrated in Table 1 below.

TABLE 1

| QCL component carrier | CC1, CC2, CC3 |
| Non-QCL component carrier | CC4, CC5 |

Table 1 shows that CC1 to CC3 are QCL or co-located, and CC4 and CC5 are not co-located with other CCs.

According to an embodiment, the electronic device may obtain the first beam tracking result for PCell through PCC, and may use the first beam tracking result for SCell or through SCC during the second beam tracking. For example, the electronic device may schedule a physical downlink shared channel (PDSCH) on SCC through a physical downlink control channel (PDCCH) on PCC. The electronic device may obtain the first beam tracking result through the PDCCH and may use the first beam tracking result upon receiving the PDSCH according to the PDSCH scheduling. For example, the electronic device may obtain PCell reception beam information through PDCCH, and may determine a reception beam to be used upon receiving the PDSCH in the PCell and/or SCell.

According to an embodiment, the electronic device may transmit a physical uplink control channel (PUCCH) on PCC. The electronic device may determine a transmission beam to be used upon transmitting PUSCH in PCell and/or SCell, using transmission beam information of PUCCH. The electronic device may transmit the PUSCH by applying the transmission beam.

According to an embodiment, when a plurality of CCs are set in the licensed band, and CC is set within the same system bandwidth, the electronic device may determine whether CCs are co-located as follows.

According to an embodiment, when a plurality of CCs are set in the same system bandwidth, the electronic device may regard that each CC is co-located. For example, when a single system bandwidth includes a frequency band in which a plurality of CCs are set, the electronic device may identify the co-located CC.

The electronic device may identify that a plurality of CCs are present in the same system bandwidth, using at least one of the following conditions:

A case that the plurality of CCs have a continuous frequency band and use the same physical cell identification (ID), A case that the plurality of CCs have a continuous frequency band and different physical cell IDs, but the TDD settings are the same, A case that the plurality of CCs have a continuous frequency band and different physical cell IDs, but the actual transmission positions of a single sideband block (SSB) is the same, A case that it is determined that the plurality of CCs have a continuous frequency band and a guard band between the plurality of CCs is 0, A case that the plurality of CCs operate in a continuous frequency band and use physical resource block (PRB) indexing in common, and A case that the plurality of CCs operate in a non-contiguous frequency band and use PRB indexing in common.

According to an embodiment, the relationship between the SSB(s) and a reference signal (RS) is defined as follows, and may be signaled.

Table 2 illustrates the relationship between SSB(s) and RS.

TABLE 2

| QCL parameter | Reference RS | Target RS | Signalling mode | Reference RS and Target RS should belong to the same CC/BWP or not |
|---|---|---|---|---|
| Spatial | SSB | P CSI-RS | RRC | Can be on different CCs/BWPs |
| Spatial | SSB | SP CSI-RS | SP CSI-RS activation signal | Can be on different CCs/BWPs |
| Spatial | P CSI-RS | Another P CSI-RS | RRC | Can be on different CCs/BWPs |
| Spatial | SSB or P/SP CSI-RS | AP CSI-RS | RRC or RRC + MAC CE for configuration, indication with DCI | Can be on different CCs/BWPs |

Referring to Table 2, an association relationship of spatial QCL may be identified. According to an embodiment, when a reference RS is SSB, it may be assumed that periodic channel state information-RS (P CSI-RS) is spatial QCL to the target RS, in the electronic device. According to an embodiment, the base station may set the target RS for an electronic device through RRC signaling. For example, the electronic device tracking SSB index (#0) may be configured to track periodic CSI-RS (ID #0), on which spatial QCL is performed with SSB index (#0), through RRC connection. For another example, the electronic device tracking a specific periodic CSI-RS (ID #0) may be configured to track another periodic CSI-RS (ID #1) set in an RRC connection. In this case, in addition, the periodic CSI-RS of different CC(s) or different bandwidth part(s) (BWP) may be set together. The plurality (e.g., 4) of different BWPs may be included in CC(s), and may be set in the form of a MAC control element (CE) or downlink control information (DCI), in addition to the RRC message.

According to an embodiment, when the reference RS is SSB, it may be assumed that the semi-persistent (SP) CSI-RS is spatial QCL to the target RS, in the electronic device. According to an embodiment, a base station may set the target RS for the electronic device, using the SP-CSI RS activation signal. For example, the electronic device tracking SSB index (#0) may be configured to track SP CSI-RS (ID #3), on which spatial QCL is performed with SSB index (#0), using an SP-CSI RS activation signal. In this case, the periodic CSI-RS of different CC(s) or different bandwidth part(s) (BWP) may be additionally set together.

According to an embodiment, when the reference RS is periodic CSI-RS, it may be assumed that another periodic CSI-RS is spatial QCL to the target RS, in the electronic device. The base station may set the target RS for an electronic device through RRC signaling. For example, the electronic device tracking a specific periodic CSI-RS (ID #0) may be configured to track another periodic CSI-RS (ID #1) set in an RRC connection. In this case, another periodic CSI-RS of different CC(s) or different BWPs may be additionally set together.

According to an embodiment, when a reference RS is SSB or P/SP CSI-RS, it may be assumed that aperiodic RS is spatial QCL to the target RS, in the electronic device. The target RS may be set from a base station to a terminal through an RRC or RRC+ medium access control (MAC) channel element (CE), and may be signaled with a layer 1 (L1) indication. For example, an electronic device tracking SSB index (#0) may set at least one or more aperiodic CSI-RSs (ID #4 to #10) through an RRC or MAC CE message to a tracking candidate group, and may determine aperiodic CSI-RS (ID #10) by means of the L1 indication.

In Table 2, the target RS corresponding to the reference RS determined in a single CC may be extended to the target RS to receive PDSCH of different CC(s) or different BWP (s), to obtain CSI, and/or to measure a beam. For example, whether to apply all of a beam width, beam sweep order, or direction of one CC to the target RS of another CC may be explicitly signaled to the electronic device; in the electronic device, being identically applied to the other CC may be implicitly assumed when the beam width, a beam sweep order, or direction of the one reference CC is signaled. In addition to the above-described scheme, the signaling scheme may be applied to various schemes such as a signaling scheme in the form of a transmission configuration indication (TCI).

Figure 10:
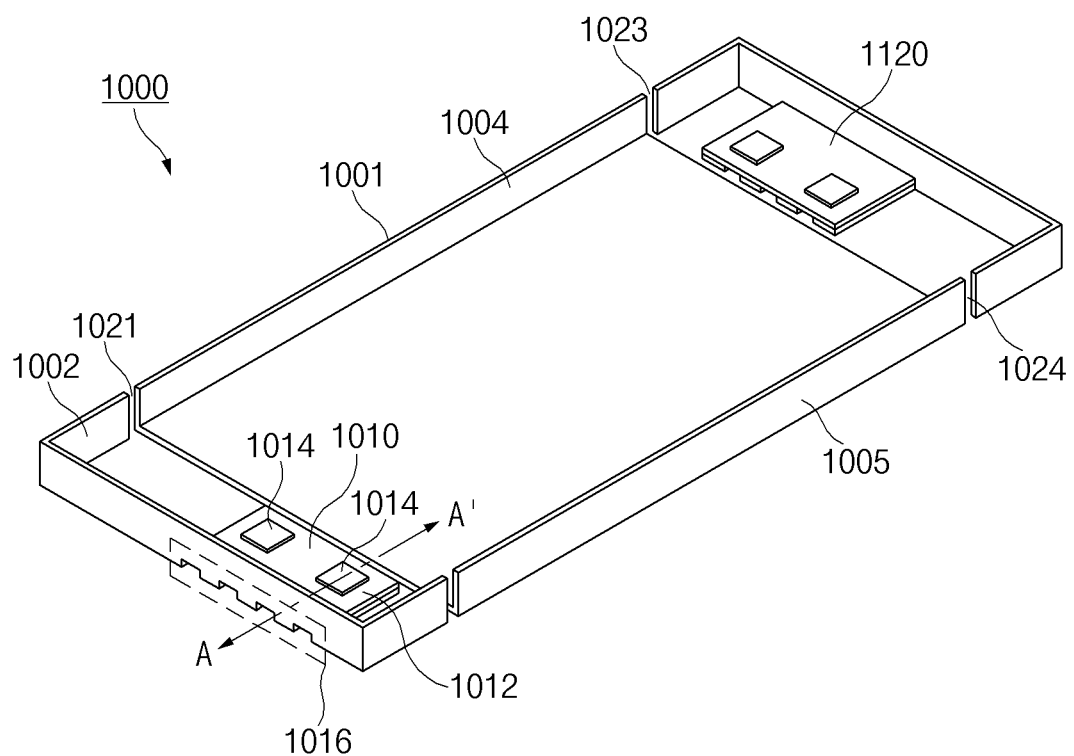
FIG. 10 illustrates an arrangement structure of an antenna module according to an embodiment.
Figure 11:
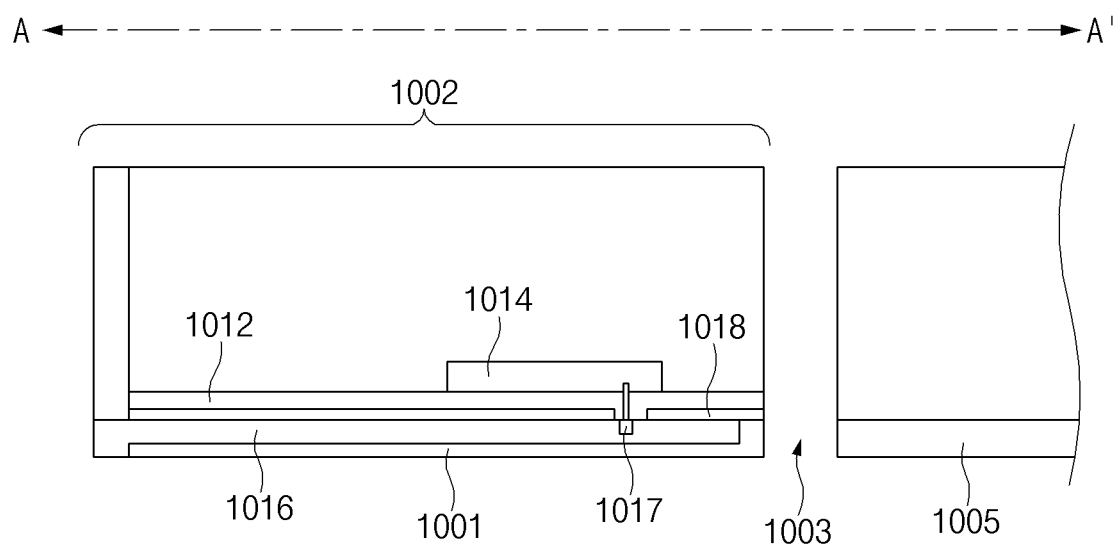
FIG. 11 illustrates an arrangement structure of an antenna module according to an embodiment.

FIGS. 10 and 11 illustrate an arrangement structure of an antenna module according to an embodiment.

According to an embodiment, an electronic device 1000 may include a plurality of antenna modules 1010 and 1120.

The first antenna module 1010 (e.g., the first antenna module 130 of FIG. 2) may include an antenna array 1016 and at least one RFIC 1014. According to an embodiment, the at least one RFIC 1014 may include an RFIC.

According to an embodiment, the antenna array 1016 may be implemented in the form of a waveguide, and may transmit or receive a signal in mmWave band. In FIG. 10, array antenna of four antenna arrays are illustrated, but are not limited thereto, and the various numbers of antennas may be included in the array antenna.

In FIG. 10, two RFICs 1014 are illustrated, but the various numbers of RFICs 1014 may be included in the first antenna module 1010. Another example may be exemplified as the single RFIC 1014 is connected to two antennas, but the RFIC 1014 may be connected to the various numbers of antennas.

Because the loss in the mmWave band is large due to the transmission line, the RFIC 1014 and the antenna array 1016 may be disposed to be adjacent to each other. An embodiment is exemplified in FIG. 10 as the antenna array 1016 is adjacent to a printed circuit board 1012 on which the RFIC 1014 is mounted. According to various embodiments, the second antenna module 1120 may include a configuration identical or similar to the configuration of the first antenna module 1010.

According to an embodiment, the electronic device 1000 may include housing 1001, and at least part of the housing may function as an antenna element. The at least part of the housing 1001 may be metal housing made of a metal material. For example, a side member of the housing 1001 may function as an antenna element.

According to an embodiment, the side member may be divided into a plurality of conductive portions 1002, 1004, and 1005 by a plurality of non-conductive portions 1021, 1022, 1023, and 1024. According to an embodiment, when an electrical signal is supplied to a single conductive portion (e.g., the first conductive part 1002), the conductive portion may operate as an antenna. The conductive portion may operate as a legacy (e.g., 4G) antenna. The plurality of non-conductive portions 1021, 1022, 1023, and 1024 may be referred to as slots.

According to an embodiment, even when the antenna array 1016 and the first conductive portion 1002 share the same conductive region as each other, the mutually-available frequency bands are different from each other, and thus the effect of interference may be less.

FIG. 11 is a cross-sectional view of the electronic device of FIG. 10 taken in a direction from A to A'.

According to an embodiment, the RFIC 1014 may be disposed on the printed circuit board 1012, and a ground layer 1018 may be disposed on the opposite surface of the RFIC 1014 on the printed circuit board 1012. According to an embodiment, the antenna array 1016 may be formed by the non-conductive portion 1003 and the ground layer 1018.

According to an embodiment, the RFIC 1014 and the feeding part 1018 may be electrically connected through a via 1017 of the printed circuit board 1012.

In FIG. 11, the antenna array 1016 may be arranged variously. For example, the antenna array 1016 may be mounted on the front surface, rear surface, and/or bezel of the housing 1001.

According to various embodiments, the antenna array 1016 may be formed of various types of antennas such as a patch antenna and/or a dipole antenna.

According to an embodiment disclosed in this specification, an electronic device (e.g., the electronic device 100 of FIG. 2) may include housing, a first antenna array (e.g., the first antenna array 450a of FIG. 4) positioned on the housing and/or inside the housing, a second antenna array (e.g., the second antenna array 450b of FIG. 4) spaced from the first antenna array and positioned on the housing and/or inside the housing, at least one wireless communication circuit (e.g., the communication circuit 320 of FIG. 3) electrically connected to the first antenna array and the second antenna array, and at least one communication processor (e.g., the communication module 120 of FIG. 2 or the CP 411 of FIG. 4) transmitting and/or receiving a signal through the at least one wireless communication circuit, using beamforming.

The at least one communication processor may be configured to perform first beam tracking on a first component carrier associated with a base station, using the first antenna array, to determine a first direction for beamforming for communication with the base station based at least partly on a result of the first beam tracking, and to perform second beam tracking on a second component carrier by partly using the first direction, using the second antenna array.

According to an embodiment, the at least one communication processor may be further configured to use a first direction for beamforming for communication with the base station with respect to the second component carrier, using the second antenna array.

According to an embodiment, the at least one communication processor may be configured to determine a second direction different from the first direction for communication with the base station, based at least partly on a result of the second beam tracking for beamforming.

According to an embodiment, the at least one communication processor may be configured to perform first beam tracking during a first time interval and to perform the second beam tracking during a second time interval shorter than the first time interval.

According to an embodiment, the base station may include a transmission/reception point (TRP).

According to an embodiment, the result of the first beam tracking may include a value associated with a phase.

According to an embodiment, the first component carrier may be a primary component carrier (PCC), and the second component carrier may be a secondary component carrier (SCC).

According to an embodiment, the first component carrier and the second component carrier may be set in a band between 3 GHz and 100 GHz.

According to an embodiment, the at least one communication processor may be configured to transmit or receive a control signal or a data signal with the base station through the first component carrier, using the first direction, and to transmit or receive a control signal or a data signal with the base station through the second component carrier, using the second direction.

According to an embodiment, the first component carrier may be set in a licensed band, and the second component carrier may be set in an unlicensed band.

According to an embodiment, a method performed by the electronic device may include performing first beam tracking on a first component carrier associated with a base station, using a first antenna array, determining a first direction for beamforming for communication with the base station based at least partly on a result of the first beam tracking, and performing second beam tracking on a second component carrier based partly on the first direction, using the second antenna array.

According to an embodiment, the performing of the second beam tracking may include performing second beam tracking, using the first direction.

According to an embodiment, the method may further include determining a second direction for beamforming for communication with the base station based at least partly on a result of the second beam tracking.

According to an embodiment, the first beam tracking may be performed during a first time interval. The second beam tracking may be performed during a second time interval shorter than the first time interval.

According to an embodiment, the result of the first beam tracking may include a value associated with a phase.

According to an embodiment disclosed in this specification, an electronic device (e.g., the electronic device 100 of FIG. 2) may include housing, a first antenna array (the first antenna array 450a of FIG. 4) positioned on the housing and/or inside the housing, a second antenna array (e.g., the second antenna array 450b of FIG. 4) spaced from the first antenna array and positioned on the housing and/or inside the housing, at least one wireless communication circuit (e.g., the communication circuit 320 of FIG. 3) electrically connected to the first antenna array and the second antenna array, and at least one communication processor (e.g., the communication module 120 of FIG. 2 or the CP 411 of FIG. 4) transmitting and/or receiving a signal through the at least one wireless communication circuit, using beamforming.

The at least one communication processor may be configured to start carrier aggregation, using a first frequency between 50 GHz and 70 GHz and a second frequency between 20 GHz and 45 GHz for communication with a base station, to determine whether communication using the first frequency is available, to perform beam tracking using the second frequency when the communication using the first frequency is not available, and to communicate with the base station, using the carrier aggregation when the communication using the first frequency is available.

According to an embodiment, the at least one communication processor may be configured to perform beam tracking using the first frequency based at least partly on the beam tracking result when a state where the communication using the first frequency is not available becomes an available state.

According to an embodiment, the result of the beam tracking may include a value associated with a phase.

According to an embodiment, a primary component carrier (PCC) may be set on the first frequency, and a secondary component carrier (SCC) may be set on the second frequency; or the SCC may be set on the first frequency, and the PCC may be set on the second frequency.

According to an embodiment, the first frequency may include an unlicensed band, and the second frequency may include a licensed band.

FIG. 12 is a block diagram of an electronic device in the network environment 1200 according to various embodiments. Referring to FIG. 12, the electronic device 1201 may communicate with an electronic device 1202 through a first network 1298 (e.g., a short-range wireless communication network) or may communicate with an electronic device 1204 or a server 1208 through a second network 1299 (e.g., a long-distance wireless communication network) in the network environment 1200. According to an embodiment, the electronic device 1201 may communicate with the electronic device 1204 through the server 1208. According to an embodiment, the electronic device 1201 (e.g., the electronic device 100 of FIG. 1) may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module 1296, or an antenna module 1297. According to some embodiments, at least one (e.g., the display device 1260 or the camera module 1280) among components of the electronic device 1201 may be omitted or one or more other components may be added to the electronic device 1201. According to some embodiments, some of the above components may be implemented with one integrated circuit. For example, the sensor module 1276 (e.g., a fingerprint sensor, an iris sensor, or an illuminance sensor) may be embedded in the display device 1260 (e.g., a display).

The processor 1220 (e.g., the processor 110 of FIG. 2) may execute, for example, software (e.g., a program 1240) to control at least one of other components (e.g., a hardware or software component) of the electronic device 1201 connected to the processor 1220 and may process or compute a variety of data. According to an embodiment, as a part of data processing or operation, the processor 1220 may load a command set or data, which is received from other components (e.g., the sensor module 1276 or the communication module 1290), into a volatile memory 1232, may process the command or data loaded into the volatile memory 1232, and may store result data into a nonvolatile memory 1234. According to an embodiment, the processor 1220 may include a main processor 1221 (e.g., a central processing unit or an application processor) and an auxiliary processor 1223 (e.g., a graphic processing device, an image signal processor, a sensor hub processor, or a communication processor), which operates independently from the main processor 1221 or with the main processor 1221. Additionally or alternatively, the auxiliary processor 1223 may use less power than the main processor 1221, or is specified to a designated function. The auxiliary processor 1223 may be implemented separately from the main processor 1221 or as a part thereof.

The auxiliary processor 1223 may control, for example, at least some of functions or states associated with at least one component (e.g., the display device 1260, the sensor module 1276, or the communication module 1290) among the components of the electronic device 1201 instead of the main processor 1221 while the main processor 1221 is in an inactive (e.g., sleep) state or together with the main processor 1221 while the main processor 1221 is in an active (e.g., an application execution) state. According to an embodiment, the auxiliary processor 1223 (e.g., the image signal processor or the communication processor) may be implemented as a part of another component (e.g., the camera module 1280 or the communication module 1290) that is functionally related to the auxiliary processor 1223.

The memory 1230 may store a variety of data used by at least one component (e.g., the processor 1220 or the sensor module 1276) of the electronic device 1201. For example, data may include software (e.g., the program 1240) and input data or output data with respect to commands associated with the software. The memory 1230 may include the volatile memory 1232 or the nonvolatile memory 1234.

The program 1240 may be stored in the memory 1230 as software and may include, for example, an operating system 1242, a middleware 1244, or an application 1246.

The input device 1250 may receive a command or data, which is used for a component (e.g., the processor 1220) of the electronic device 1201, from an outside (e.g., a user) of the electronic device 1201. The input device 1250 may include, for example, a microphone, a mouse, a keyboard, or a digital pen (e.g., a stylus pen).

The sound output device 1255 may output a sound signal to the outside of the electronic device 1201. The sound output device 1255 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 1260 may visually provide information to the outside (e.g., the user) of the electronic device 1201. For example, the display device 1260 may include a display, a hologram device, or a projector and a control circuit for controlling a corresponding device. According to an embodiment, the display device 1260 may include a touch circuitry configured to sense the touch or a sensor circuit (e.g., a pressure sensor) for measuring an intensity of pressure on the touch.

The audio module 1270 may convert a sound and an electrical signal in dual directions. According to an embodiment, the audio module 1270 may obtain the sound through the input device 1250 or may output the sound through the sound output device 1255 or an external electronic device (e.g., the electronic device 1202 (e.g., a speaker or a headphone)) directly or wirelessly connected to the electronic device 1201.

The sensor module 1276 may generate an electrical signal or a data value corresponding to an operating state (e.g., power or temperature) inside or an environmental state (e.g., a user state) outside the electronic device 1201. According to an embodiment, the sensor module 1276 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1277 may support one or more designated protocols to allow the electronic device 1201 to connect directly or wirelessly to the external electronic device (e.g., the electronic device 1202). According to an embodiment, the interface 1277 may include, for example, an HDMI (high-definition multimedia interface), a USB (universal serial bus) interface, an SD card interface, or an audio interface.

A connecting terminal 1278 may include a connector that physically connects the electronic device 1201 to the external electronic device (e.g., the electronic device 1202). According to an embodiment, the connecting terminal 1278 may include, for example, an HDMI connector, a USB connector, an SD card connector, or an audio connector (e.g., a headphone connector).

The haptic module 1279 may convert an electrical signal to a mechanical stimulation (e.g., vibration or movement) or an electrical stimulation perceived by the user through tactile or kinesthetic sensations. According to an embodiment, the haptic module 1279 may include, for example, a motor, a piezoelectric element, or an electric stimulator.

The camera module 1280 may shoot a still image or a video image. According to an embodiment, the camera module 1280 may include, for example, at least one or more lenses, image sensors, image signal processors, or flashes.

The power management module 1288 may manage power supplied to the electronic device 1201. According to an embodiment, the power management module 1288 may be implemented as at least a part of a power management integrated circuit (PMIC).

The battery 1289 may supply power to at least one component of the electronic device 1201. According to an embodiment, the battery 1289 may include, for example, a non-rechargeable (primary) battery, a rechargeable (secondary) battery, or a fuel cell.

The communication module 1290 may establish a direct (e.g., wired) or wireless communication channel between the electronic device 1201 and the external electronic device (e.g., the electronic device 1202, the electronic device 1204, or the server 1208) and support communication execution through the established communication channel. The communication module 1290 may include at least one communication processor operating independently from the processor 1220 (e.g., the application processor) and supporting the direct (e.g., wired) communication or the wireless communication. According to an embodiment, the communication module 1290 may include a wireless communication module 1292 (e.g., a cellular communication module, a short-range wireless communication module, or a GNSS (global navigation satellite system) communication module) or a wired communication module 1294 (e.g., an LAN (local area network) communication module or a power line communication module). The corresponding communication module among the above communication modules may communicate with the external electronic device through the first network 1298 (e.g., the short-range communication network such as a Bluetooth, a WiFi direct, or an IrDA (infrared data association)) or the second network 1299 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 1292 may identify and authenticate the electronic device 1201 using user information (e.g., international mobile subscriber identity (IMSI)) stored in the subscriber identification module 1296 in the communication network, such as the first network 1298 or the second network 1299.

The antenna module 1297 may transmit or receive a signal or power to or from the outside (e.g., an external electronic device). According to an embodiment, the antenna module 1297 may include one or more antennas. For example, the communication module 1290 may select one antenna suitable for a communication method used in the communication network such as the first network 1298 or the second network 1299. The signal or power may be transmitted or received between the communication module 1290 and the external electronic device through the selected one antenna.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1201 and the external electronic device 1204 through the server 1208 connected to the second network 1299. Each of the electronic devices 1202 and 1204 may be the same or different types as or from the electronic device 1201. According to an embodiment, all or some of the operations performed by the electronic device 1201 may be performed by one or more external electronic devices among the external electronic devices 1202, 1204, or 1208. For example, when the electronic device 1201 performs some functions or services automatically or by request from a user or another device, the electronic device 1201 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 1201. The electronic device 1201 may provide the result as is or after additional processing as at least a part of the response to the request. To this end, for example, a cloud computing, distributed computing, or client-server computing technology may be used.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 1240) including an instruction stored in a machine-readable storage medium (e.g., an internal memory 1236 or an external memory 1238) readable by a machine (e.g., the electronic device 1201). For example, the processor (e.g., the processor 1220) of a machine (e.g., the electronic device 1201) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The invention claimed is:

1. An electronic device comprising:
a housing;
a first antenna array positioned on the housing and/or inside the housing;
a second antenna array spaced from the first antenna array and positioned on the housing and/or inside the housing; and
at least one communication processor electrically connected to the first antenna array and the second antenna array and configured to transmit and/or receive a signal using beamforming,
wherein the at least one communication processor is configured to:
perform first beam tracking on a first component carrier associated with a base station, using the first antenna array;
determine a first direction for beamforming for communication with the base station based at least partly on a result of the first beam tracking; and
perform second beam tracking on a second component carrier by partly using the first direction, using the second antenna array.

2. The electronic device of claim 1, wherein the at least one communication processor is further configured to:
use the first direction for beamforming for communication with the base station with respect to the second component carrier, using the second antenna array.

3. The electronic device of claim 1, wherein the at least one communication processor is configured to:
determine a second direction different from the first direction for communication with the base station, based at least partly on a result of the second beam tracking for beamforming.

4. The electronic device of claim 1, wherein the at least one communication processor is configured to:
perform the first beam tracking during a first time interval; and
perform the second beam tracking during a second time interval shorter than the first time interval.

5. The electronic device of claim 1, wherein the base station includes a transmission/reception point (TRP).

6. The electronic device of claim 1, wherein the result of the first beam tracking includes a value associated with a phase.

7. The electronic device of claim 1, wherein the first component carrier is a primary component carrier (PCC), and the second component carrier is a secondary component carrier (SCC).

8. The electronic device of claim 1, wherein the first component carrier and the second component carrier are set in a band between 3 GHz and 100 GHz.

9. The electronic device of claim 3, wherein the at least one communication processor is configured to:
transmit or receive a control signal or a data signal with the base station through the first component carrier, using the first direction; and
transmit or receive a control signal or a data signal with the base station through the second component carrier, using the second direction.

10. The electronic device of claim 1, wherein the first component carrier is set in a licensed band, and the second component carrier is set in an unlicensed band.

11. A method comprising:
performing first beam tracking on a first component carrier associated with a base station, using a first antenna array;
determining a first direction for beamforming for communication with the base station based at least partly on a result of the first beam tracking; and
performing second beam tracking on a second component carrier based partly on the first direction, using the second antenna array.

12. The method of claim 11, wherein the performing of the second beam tracking includes:
performing the second beam tracking, using the first direction.

13. The method of claim 11, further comprising:
determining a second direction for beamforming for communication with the base station based at least partly on a result of the second beam tracking.

14. The method of claim 11,
wherein the first beam tracking is performed during a first time interval, and
wherein the second beam tracking is performed during a second time interval shorter than the first time interval.

15. The method of claim 11, wherein the result of the first beam tracking includes a value associated with a phase.

* * * * *